US012697895B2

(12) United States Patent
Xia et al.

(10) Patent No.: US 12,697,895 B2
(45) Date of Patent: Aug. 4, 2026

(54) VEHICLE CHARGING METHOD AND APPARATUS

(71) Applicant: Yinwang Intelligent Technologies Co., Ltd., Shenzhen (CN)

(72) Inventors: Hongpu Xia, Shanghai (CN); Hui Feng, Shanghai (CN); Yalin Liu, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 804 days.

(21) Appl. No.: 18/181,815

(22) Filed: Mar. 10, 2023

(65) Prior Publication Data

US 2023/0211697 A1      Jul. 6, 2023

Related U.S. Application Data

(63) Continuation of application No. PCT/CN2020/114811, filed on Sep. 11, 2020.

(51) Int. Cl.
| | |
|---|---|
| B60L 53/68 | (2019.01) |
| B60L 58/12 | (2019.01) |
| B60L 58/18 | (2019.01) |

(52) U.S. Cl.
CPC ............... B60L 53/68 (2019.02); B60L 58/12 (2019.02); B60L 58/18 (2019.02); *B60L 2240/70* (2013.01)

(58) Field of Classification Search
CPC .......... B60L 58/12; B60L 58/18; B60L 53/68
USPC ....................................................... 320/109
See application file for complete search history.

(56) References Cited

U.S. PATENT DOCUMENTS

| | | | |
|---|---|---|---|
| 2012/0161692 A1 | 6/2012 | Kobayashi et al. | |
| 2019/0009756 A1* | 1/2019 | Jacobs | ................... B60L 53/80 |
| 2020/0086754 A1 | 3/2020 | Hou et al. | |
| 2020/0238846 A1 | 7/2020 | Ma | |
| 2022/0388413 A1* | 12/2022 | Brannan | ................. B60L 53/35 |

FOREIGN PATENT DOCUMENTS

| | | |
|---|---|---|
| CN | 104022548 A | 9/2014 |
| CN | 104118402 A | 10/2014 |
| CN | 107241413 A | 10/2017 |

(Continued)

OTHER PUBLICATIONS

Office Action in Chinese Appln. No. 202080004696.9, dated Aug. 17, 2021, 9 pages (with English translation).

(Continued)

*Primary Examiner* — Nathaniel R Pelton
(74) *Attorney, Agent, or Firm* — Fish & Richardson P.C.

(57) ABSTRACT

An example method includes: obtaining a status of a first battery pack in a first mobile charging facility; in response to determining that the first battery pack is in a charging state or a fully charged state, obtaining a second state of energy sent by a second mobile charging facility, where the second mobile charging facility is charging a first vehicle, and the second state of energy is a state of energy of a second battery pack in the second mobile charging facility; and in response to at least that a first state of energy and the second state of energy meet a first preset condition, sending a first indication signal to the first mobile charging facility for indicating the first mobile charging facility to charge the first vehicle.

16 Claims, 8 Drawing Sheets

(56)         References Cited

FOREIGN PATENT DOCUMENTS

| CN | 107310534 A | 11/2017 |
| CN | 107657374 A | 2/2018 |
| CN | 109532548 A | 3/2019 |
| CN | 109982452 A | 7/2019 |
| CN | 110263228 A | 9/2019 |
| CN | 110807613 A | 2/2020 |

OTHER PUBLICATIONS

International Search Report and Written Opinion in International Appln. No. PCT/CN2020/114811, mailed on Jun. 9, 2021, 18 pages (with English translation).
Extended European Search Report in European Appln No. 20952831. 4, dated Oct. 9, 2023, 10 pages.

* cited by examiner

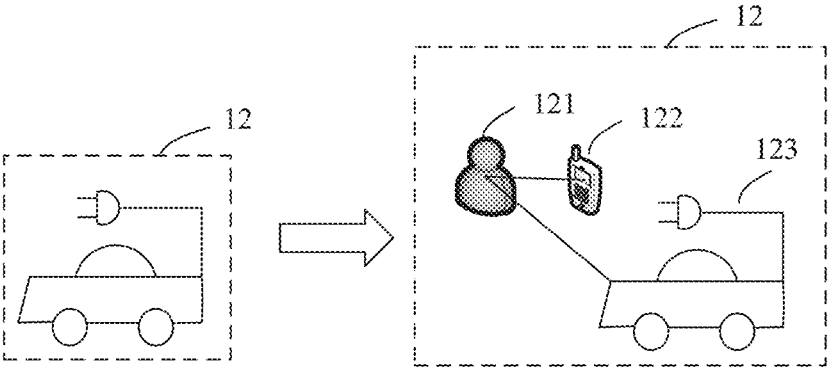

FIG. 3

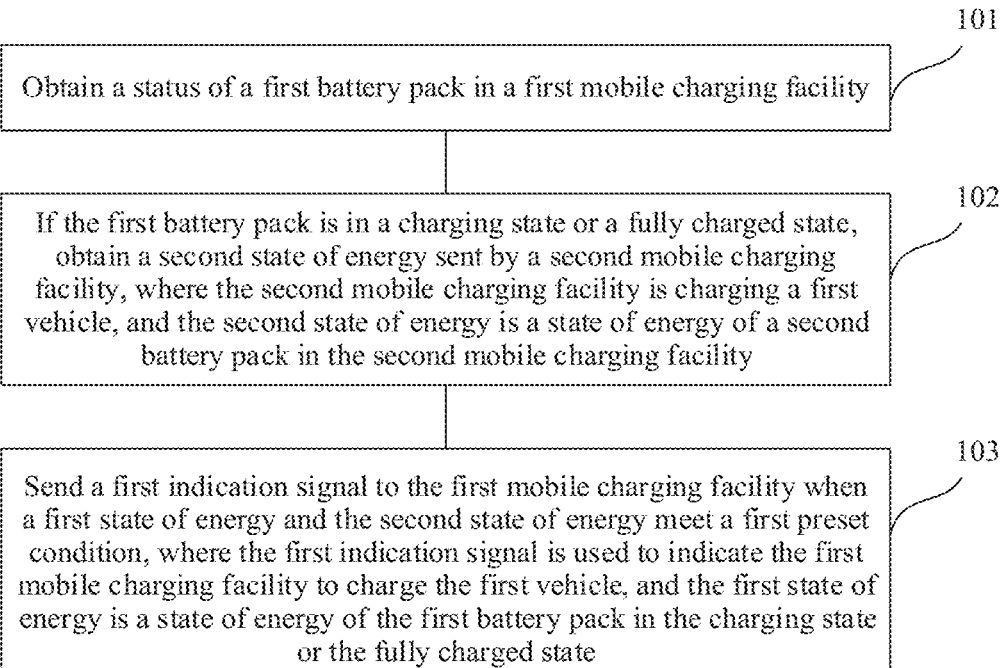

101

Obtain a status of a first battery pack in a first mobile charging facility

102

If the first battery pack is in a charging state or a fully charged state, obtain a second state of energy sent by a second mobile charging facility, where the second mobile charging facility is charging a first vehicle, and the second state of energy is a state of energy of a second battery pack in the second mobile charging facility

103

Send a first indication signal to the first mobile charging facility when a first state of energy and the second state of energy meet a first preset condition, where the first indication signal is used to indicate the first mobile charging facility to charge the first vehicle, and the first state of energy is a state of energy of the first battery pack in the charging state or the fully charged state

FIG. 4

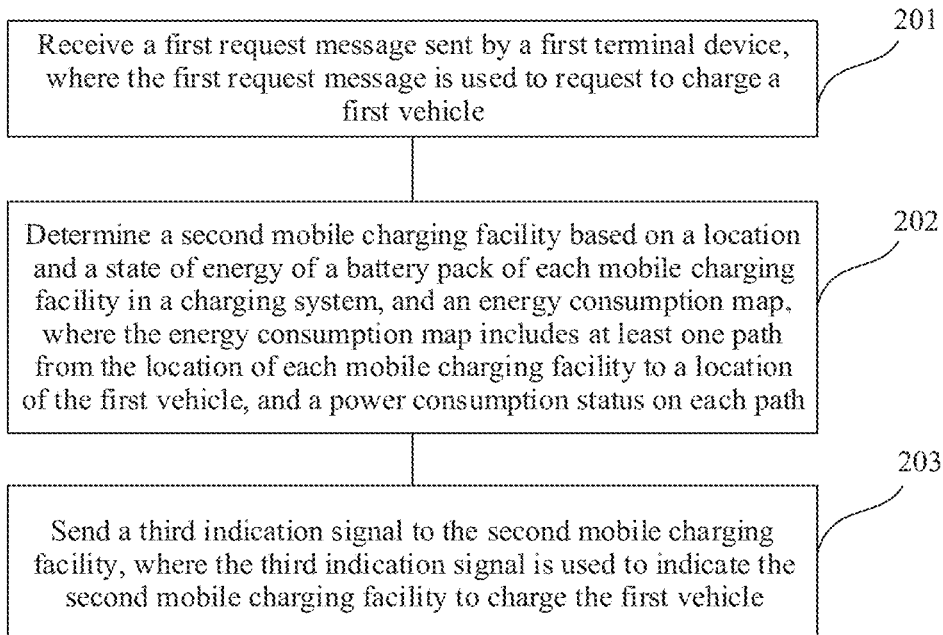

201

Receive a first request message sent by a first terminal device, where the first request message is used to request to charge a first vehicle

202

Determine a second mobile charging facility based on a location and a state of energy of a battery pack of each mobile charging facility in a charging system, and an energy consumption map, where the energy consumption map includes at least one path from the location of each mobile charging facility to a location of the first vehicle, and a power consumption status on each path

203

Send a third indication signal to the second mobile charging facility, where the third indication signal is used to indicate the second mobile charging facility to charge the first vehicle

FIG. 5

| | t1 | t2 | t3 | t4 | t5 | t6 | t7 | t8 | t9 |
|---|---|---|---|---|---|---|---|---|---|
| | 15 | 5 | | 25 | | | | | |
| State of energy of a battery pack in A1 | 40 | 35 | 30 | 35 | 40 | 35 | 30 | 25 | 30 |
| State of energy of a battery pack in A2 | 40 | 40 | 35 | 30 | 25 | 30 | 35 | 40 | 35 |
| State of total energy of a system | 80 | 75 | 65 | 65 | 65 | 65 | 65 | 65 | 65 |

Vehicle charging apparatus

Obtaining unit — 1101

Processing unit — 1102

Sending unit — 1103

VEHICLE CHARGING METHOD AND APPARATUS

CROSS-REFERENCE TO RELATED APPLICATIONS

This application is a continuation of International Application No. PCT/CN2020/114811, filed on Sep. 11, 2020, the disclosure of which is hereby incorporated by reference in its entirety.

TECHNICAL FIELD

This application relates to the field of vehicle charging technologies, and in particular, to a method and an apparatus for scheduling a mobile charging facility to charge a vehicle.

BACKGROUND

With development and large-scale use of new energy vehicles, mobile charging facilities are increasingly favored by users because they have flexible charging resources and are not restricted by environment and parking space conditions. As shown in FIG. 1, the mobile charging facility is specifically implemented in a form of a movable charging pile, or a movable chassis carrying a battery pack. For example, when the mobile charging facility is a mobile charging vehicle, a chassis of the mobile charging vehicle may carry a plurality of battery packs. After receiving an order request of a user, the mobile charging vehicle travels to a location of the user, and provides a charging service for a vehicle driven by the user, to complete a charging task.

Currently, a process in which a mobile charging vehicle receives an order request and completes a charging task is based on the order request. In other words, each mobile charging vehicle needs to first charge a vehicle of a current order and then return to be charged after a charging requirement of the vehicle of the current order is met, and can continue to provide a service for a new order request only after being charged. Due to unpredictability of generating a new order by a user, a battery pack of the mobile charging vehicle may not receive the new order for a long time in a fully charged state. As a result, the mobile charging vehicle waits in place for a long time, a throughput of electric energy of a charging system is decreased, and charging efficiency is reduced.

SUMMARY

This application provides a vehicle charging method and apparatus, to reduce time for a mobile charging facility to wait in place after the mobile charging facility is fully charged at a charging pile, and increase a throughput of electric energy of a system. To resolve the technical problem, this application discloses the following technical solutions.

According to a first aspect, this application provides a vehicle charging method. The method is used to schedule a mobile charging facility in a charging system to charge a vehicle of request, and the method includes: obtaining a status of a first battery pack in a first mobile charging facility; if the first battery pack is in a charging state or a fully charged state, obtaining a second state of energy sent by a second mobile charging facility, where the second mobile charging facility is charging a first vehicle, and the second state of energy is a state of energy of a second battery pack in the second mobile charging facility; and sending a first indication signal to the first mobile charging facility when a first state of energy and the second state of energy meet a first preset condition, where the first indication signal is used to indicate the first mobile charging facility to charge the first vehicle, and the first state of energy is a state of energy of the first battery pack in the charging state or the fully charged state.

According to the method provided in this aspect, when it is detected that a battery pack of a mobile charging facility is in a charging state or a fully charged state, a charging indication signal is sent to the mobile charging facility, so that the mobile charging facility executes a charging task in the charging state or once the mobile charging facility reaches the fully charged state. A replaced mobile charging facility returns to be charged. This prevents the mobile charging facility in the fully charged state from waiting in place for a server to deliver a new charging task, eliminates time for the mobile charging facility to wait in place, and improves a throughput and charging efficiency of electric energy of a charging system.

In this application, the throughput is a sum of absolute values of a state of charged energy and a state of discharged energy of battery packs in all mobile charging facilities in the charging system.

Optionally, with reference to the first aspect, in a possible implementation of the first aspect, the method further includes: sending a second indication signal to the second mobile charging facility. The second indication signal is used to indicate the second mobile charging facility to return to be charged. In this implementation, an indication signal is sent to the replaced second mobile charging facility, to indicate the second mobile charging facility to return to the charging pile to charge the battery pack. The battery pack of the second mobile charging facility still has a state of remaining energy when the indication signal is sent. In this case, compared with a case in which the second mobile charging facility returns to the charging pile to be charged after power of the battery pack is used up, this can save time for fully charging the battery pack, so that the battery pack of the second mobile charging facility can be fully charged more quickly to provide a charging service for a new order request, to improve charging efficiency.

With reference to the first aspect, in another possible implementation of the first aspect, that a first state of energy and the second state of energy meet a first preset condition includes: a first ratio is greater than or equal to a first threshold; and the first ratio is a percentage of a difference between the first state of energy and the second state of energy in the first state of energy.

Further, the formula indicates that the first preset condition is:

$$\frac{Q1 - Q2}{Q1} \times 100\% \geq P.$$

Q1 represents the first state of energy, Q2 represents the second state of energy, and P represents the first threshold.

Optionally, the first threshold is related to a quantity of new orders generated by the charging system per unit time. If the system detects that the quantity of new orders generated per unit time is increased, the first threshold is adjusted to be increased based on an initial value; or if the quantity of new orders generated per unit time is decreased, the first threshold is adjusted to be reduced based on an initial value.

In this implementation, the first threshold is set, and when it is detected that the percentage of the difference between the first state of energy and the second state of energy in the first state of energy reaches the first threshold, a replacement operation is triggered to replace the second mobile charging facility with the current first mobile charging facility. In this way, the first mobile charging facility can provide more power for the current vehicle, and the battery pack of the second mobile charging facility can be ensured to have a state of remaining energy corresponding to at least the first threshold, so that the battery pack can be fully charged more quickly after the second mobile charging facility returns to the charging pile, to increase a throughput of electric energy of the system.

With reference to the first aspect, in still another possible implementation of the first aspect, before the obtaining a second state of energy sent by a second mobile charging facility, the method further includes: determining the second mobile charging facility.

Further, the determining the second mobile charging facility includes: if a mobile charging facility in a charging system is charging a vehicle, determining that the mobile charging facility is the second mobile charging facility; or if two or more mobile charging facilities in a charging system are charging a vehicle, determining that the second mobile charging facility is one having a maximum first ratio in the two or more mobile charging facilities.

In this implementation, when there are two or more mobile charging facilities that can accept a charging task, one battery pack having a maximum state of energy is selected to charge a vehicle, so that more electric energy can be provided for the to-be-charged vehicle, and a charging requirement of a user is met.

With reference to the first aspect, in still another possible implementation of the first aspect, the method further includes: if two or more mobile charging facilities in a charging system are charging a vehicle, determining that the second mobile charging facility is one having a maximum second ratio in the two or more mobile charging facilities.

The second ratio is a percentage of a state of remaining energy in a battery pack of the first mobile charging facility in the first state of energy, the state of remaining energy is represented as $Q_{remaining}$, $Q_{remaining}=Q1-Q2-Q_S$, Q1 represents the first state of energy, Q2 represents the second state of energy, and $Q_S$ represents a state of energy consumed on a path when the first mobile charging facility travels from a current location to a location of a mobile charging facility corresponding to Q2.

In this implementation, when power consumed by the mobile charging facility in a travelling path is considered, a mobile charging facility with a maximum state of remaining energy in a battery pack when reaching the location of the to-be-charged vehicle is selected with reference to an energy consumption map, so as to avoid that the mobile charging facility consumes excessive electric energy on the path, and reduce the state of energy of the battery pack that charges the vehicle.

With reference to the first aspect, in still another possible implementation of the first aspect, before the obtaining a status of a first battery pack in a first mobile charging facility, the method further includes: receiving a first request message sent by a first terminal device, where the first request message is used to request to charge the first vehicle; determining the second mobile charging facility based on a location and a state of energy of a battery pack of each mobile charging facility in the charging system, and an energy consumption map, where the energy consumption map includes at least one path from a location of each mobile charging facility to a location of the first vehicle, and a power consumption status on each path; and sending a third indication signal to the second mobile charging facility, where the third indication signal is used to indicate the second mobile charging facility to charge the first vehicle.

In this implementation, when a request message of the user is received, a path with least power consumption is selected as a path for the mobile charging facility to travel to the to-be-charged vehicle. This can ensure a larger state of remaining energy in the battery pack of the mobile charging device to provide more power for the to-be-charged vehicle than a determining principle in which a path is short and electric energy consumption is large.

Optionally, with reference to the first aspect, in still another possible implementation of the first aspect, when the second mobile charging facility is determined, that is, when a mobile charging facility having the maximum second ratio or the maximum state of remaining energy in the battery pack is selected, the method further includes: detecting whether the mobile charging facility having the maximum second ratio or the maximum state of remaining energy meets an availability indicator, for example, determining whether a battery temperature of the mobile charging facility is lower than a warning value. If the battery temperature is lower than the warning value, it is proved that the availability indicator of the mobile charging facility is met, and it is further determined that the mobile charging facility is the second mobile charging facility; or if the battery temperature is higher than or equal to the warning value, it is indicated that the availability indicator of the mobile charging facility is unqualified, a mobile charging facility having a $2^{nd}$ highest second ratio is selected, and availability indicator determining is performed, until a mobile charging facility that meets the availability indicator and has a high state of energy in a battery pack is selected.

It should be understood that, in addition to the battery temperature, the availability indicator may further include parameters such as a battery level, a chassis running status, and a power transformation fault. This is not limited in this embodiment. When it is detected that one or more of the foregoing availability indicators do not meet an availability condition, for example, battery fading, or failure to provide electric energy because of a power fluctuation, or charging or discharging failure because of a power transformation fault, the mobile charging facility stops a current charging task for maintenance.

In this implementation, the availability indicator of the mobile charging facility is determined, so as to ensure that the selected mobile charging facility can execute a charging task requested by the user, and avoid a case that the mobile charging facility cannot charge a vehicle because of a fault or unexpected breakdown.

According to a second aspect, this application further provides another vehicle charging method. The method includes: obtaining a status of a third mobile charging facility; if the status of the third mobile charging facility is a return status after a charging task is executed, obtaining a second state of energy sent by a second mobile charging facility, where the second mobile charging facility is charging a first vehicle, and the second state of energy is a state of energy of a second battery pack in the second mobile charging facility; and sending a fourth indication signal to the third mobile charging facility when a third state of energy and the second state of energy meet a first preset condition, where the fourth indication signal is used to indicate the third mobile charging facility to charge the first vehicle, and the third state of energy is a state of energy of a third battery pack of the third mobile charging facility in the return status.

According to the method provided in this embodiment, a state of energy of a mobile charging facility in a return status after one charging task is executed is screened, and when a preset condition is met, the mobile charging facility is dispatched to replace another mobile charging facility that is executing the charging task, so as to indicate the replaced mobile charging facility to return to be charged. Because a state of energy of the dispatched mobile charging facility is greater than a state of energy of the mobile charging facility that is executing the charging task, more electric energy can be provided for a vehicle after the replacement, and a battery pack of the replaced mobile charging facility is quickly charged, so as to provide a service for a new order request.

With reference to the second aspect, in a possible implementation of the second aspect, the method further includes: sending a fifth indication signal to the second mobile charging facility, where the fifth indication signal is used to indicate the second mobile charging facility to return to be charged.

With reference to the second aspect, in another possible implementation of the second aspect, that a third state of energy and the second state of energy meet a first preset condition includes: a third ratio is greater than or equal to a first threshold; and the third ratio is a percentage of a difference between the third state of energy and the second state of energy in the third state of energy.

With reference to the second aspect, in still another possible implementation of the second aspect, before the obtaining a status of a third mobile charging facility, the method further includes: receiving a first request message sent by a first terminal device, where the first request message is used to request to charge the first vehicle; determining the second mobile charging facility based on a location and a state of energy of a battery pack of each mobile charging facility in a charging system, and an energy consumption map, where the energy consumption map includes at least one path from a location of each mobile charging facility to a location of the first vehicle, and a power consumption status on each path; and sending a sixth indication signal to the second mobile charging facility, where the sixth indication signal is used to indicate the second mobile charging facility to charge the first vehicle.

With reference to the second aspect, in still another possible implementation of the second aspect, before the obtaining a second state of energy sent by a second mobile charging facility, the method further includes: determining the second mobile charging facility. Specifically, the determining the second mobile charging facility includes:

if a mobile charging facility in a charging system is charging a vehicle, determining that the mobile charging facility is the second mobile charging facility; or if two or more mobile charging facilities in a charging system are charging a vehicle, determining that the second mobile charging facility is one having a maximum first ratio in the two or more mobile charging facilities.

Further, the method further includes: if two or more mobile charging facilities in a charging system are charging a vehicle, determining that the second mobile charging facility is one having a maximum fourth ratio in the two or more mobile charging facilities.

The fourth ratio is a percentage of a state of remaining energy in a battery pack of the third mobile charging facility in the third state of energy. The state of remaining energy is a difference obtained by subtracting the second state of energy from a current state of energy of a third battery pack of the third mobile charging facility and then subtracting power consumption on a travelling path. The power consumption on the travelling path represents power consumed on a path when the third mobile charging facility travels from a current location to a location of the first vehicle.

According to a third aspect, this application provides a vehicle charging apparatus. The apparatus includes:

a processing unit, configured to: obtain a status of a first battery pack in a first mobile charging facility, and detect whether the first battery pack is in a charging state or a fully charged state; an obtaining unit, configured to: when the processing unit detects that the first battery pack is in the charging state or the fully charged state, obtain a second state of energy sent by a second mobile charging facility, where the second mobile charging facility is charging a first vehicle, and the second state of energy is a state of energy of a second battery pack in the second mobile charging facility, where the processing unit is further configured to detect whether a first state of energy and the second state of energy meet a first preset condition, and the first state of energy is a state of energy of the first battery pack in the charging state or the fully charged state; and a sending unit, configured to: when the processing unit detects that the first state of energy and the second state of energy meet the first preset condition, send a first indication signal to the first mobile charging facility, where the first indication signal is used to indicate the first mobile charging facility to charge the first vehicle.

Optionally, that a first state of energy and the second state of energy meet a first preset condition includes: A first ratio is greater than or equal to a first threshold; and the first ratio is a percentage of a difference between the first state of energy and the second state of energy in the first state of energy.

With reference to the third aspect, in a possible implementation of the third aspect, the sending unit is further configured to send a second indication signal to the second mobile charging facility, where the second indication signal is used to indicate the second mobile charging facility to return to be charged.

With reference to the third aspect, in another possible implementation of the third aspect, the processing unit is further configured to: before the second state of energy sent by the second mobile charging facility is obtained, and if it is detected that one mobile charging facility in a charging system is charging a vehicle, determine that the mobile charging facility is the second mobile charging facility; or if two or more mobile charging facilities in a charging system are charging a vehicle, determine that the second mobile charging facility is one having a maximum first ratio in the two or more mobile charging facilities.

With reference to the third aspect, in still another possible implementation of the third aspect, the processing unit is further configured to: if it is detected that two or more mobile charging facilities in a charging system are charging a vehicle, determine that the second mobile charging facility is one having a maximum second ratio in the two or more mobile charging facilities.

The second ratio is a percentage of a state of remaining energy in a battery pack of the first mobile charging facility in the first state of energy, the state of remaining energy is represented as $Q_{remaining}$, $Q_{remaining}=Q1-Q2-Q_S$, Q1 represents the first state of energy, Q2 represents the second state of energy, and $Q_S$ represents a state of energy consumed on a path when the first mobile charging facility travels from a current location to a location of a mobile charging facility corresponding to Q2.

With reference to the third aspect, in still another possible implementation of the third aspect, the obtaining unit is further configured to: before the status of the first battery pack in the first mobile charging facility is obtained, receive a first request message sent by a first terminal device, where the first request message is used to request to charge the first vehicle. The processing unit is further configured to determine the second mobile charging facility based on a location and a state of energy of a battery pack of each mobile charging facility in the charging system, and an energy consumption map, where the energy consumption map includes at least one path from a location of each mobile charging facility to a location of the first vehicle, and a power consumption status on each path. The sending unit is further configured to send a third indication signal to the second mobile charging facility, where the third indication signal is used to indicate the second mobile charging facility to charge the first vehicle.

According to a fourth aspect, this application provides another vehicle charging apparatus. The apparatus includes: an obtaining unit, configured to obtain a status of a third mobile charging facility; a processing unit, configured to: if it is detected that the status of the third mobile charging facility is a return status after a charging task is executed, obtain, by using the obtaining unit, a second state of energy sent by a second mobile charging facility, and detect whether a third state of energy and the second state of energy meet a first preset condition, where the second mobile charging facility is charging a first vehicle, the second state of energy is a state of energy of a second battery pack in the second mobile charging facility, and the third state of energy is a state of energy of a third battery pack of the third mobile charging facility in the return status; and a sending unit, configured to: when the processing unit detects that the third state of energy and the second state of energy meet the first preset condition, send a fourth indication signal to the third mobile charging facility, where the fourth indication signal is used to indicate the third mobile charging facility to charge the first vehicle.

Optionally, that a third state of energy and the second state of energy meet a first preset condition includes: A second ratio is greater than or equal to a first threshold; and the second ratio is a percentage of a difference between the third state of energy and the second state of energy in the third state of energy.

With reference to the fourth aspect, in a possible implementation of the fourth aspect, the sending unit is further configured to send a fifth indication signal to the second mobile charging facility, where the fifth indication signal is used to indicate the second mobile charging facility to return to be charged.

With reference to the fourth aspect, in another possible implementation of the fourth aspect, the obtaining unit is further configured to: before the status of the third mobile charging facility is obtained, receive a first request message sent by a first terminal device, where the first request message is used to request to charge the first vehicle. The processing unit is further configured to determine the second mobile charging facility based on a location and a state of energy of a battery pack of each mobile charging facility in a charging system, and an energy consumption map, where the energy consumption map includes at least one path from a location of each mobile charging facility to a location of the first vehicle, and a power consumption status on each path. The sending unit is configured to send a sixth indication signal to the second mobile charging facility, where the sixth indication signal is used to indicate the second mobile charging facility to charge the first vehicle.

According to a fifth aspect, this application provides a network device, including a processor and a memory, where the processor is coupled to the memory, the memory is configured to store computer program instructions, and the processor is configured to execute the instructions stored in the memory, so that the network device performs the method according to the first aspect and the implementations of the first aspect, and performs the method according to the second aspect and the implementations of the second aspect.

In addition, the network device further includes a component such as a transceiver.

Specifically, in a possible implementation, the processor obtains a status of a first battery pack in a first mobile charging facility. If the first battery pack is in a charging state or a fully charged state, the processor obtains a second state of energy sent by a second mobile charging facility, where the second mobile charging facility is charging a first vehicle, and the second state of energy is a state of energy of a second battery pack in the second mobile charging facility. The processor sends a first indication signal to the first mobile charging facility through a transceiver when it is detected that a first state of energy and the second state of energy meet a first preset condition. The first indication signal is used to indicate the first mobile charging facility to charge the first vehicle, and the first state of energy is a state of energy of the first battery pack in the charging state or the fully charged state.

Optionally, in another possible implementation, the processor obtains a status of a third mobile charging facility. If the status of the third mobile charging facility is a return status after a charging task is executed, the processor obtains a second state of energy sent by a second mobile charging facility, where the second mobile charging facility is charging a first vehicle, and the second state of energy is a state of energy of a second battery pack in the second mobile charging facility. The processor sends a fourth indication signal to the third mobile charging facility through the transceiver when it is detected that a third state of energy and the second state of energy meet a first preset condition, where the fourth indication signal is used to indicate the third mobile charging facility to charge the first vehicle, and the third state of energy is a state of energy of a third battery pack of the third mobile charging facility in the return status.

It should be understood that the processor and the memory may be integrated into a chip circuit, for example, a processing chip. The processing chip includes a storage unit and a processing unit. The processing unit and the storage unit may be configured to implement all functions of the processor and the memory, and implement the method according to the implementations of the first aspect and the second aspect.

According to a sixth aspect, this application further provides a computer-readable storage medium. The storage medium stores instructions. When the instructions are run on a computer or a processor, the instructions are used to perform the method according to the first aspect and the implementations of the first aspect, and used to perform the method according to the second aspect and the implementations of the second aspect.

In addition, this application further provides a computer program product. The computer program product includes computer instructions. When the instructions are executed by a computer or a processor, the method according to the first aspect and the implementations of the first aspect and the method according to the second aspect and the implementations of the second aspect may be implemented.

It should be noted that beneficial effects of the technical solutions in the implementations of the second aspect to the sixth aspect are the same as beneficial effects of the first aspect and the implementations of the first aspect. For details, refer to descriptions of beneficial effects in the first aspect and the implementations of the first aspect. Details are not described again.

BRIEF DESCRIPTION OF DRAWINGS

FIG. 3 is a schematic diagram of a structure of a vehicle system according to an embodiment of this application;

FIG. 4 is a flowchart of a vehicle charging method according to an embodiment of this application;

FIG. 5 is a flowchart of another vehicle charging method according to an embodiment of this application;

DESCRIPTION OF EMBODIMENTS

The following describes the technical solutions of this application with reference to embodiments and the accompanying drawings of this application.

To facilitate understanding of the technical solutions provided in embodiments of this application, an application scenario to which the technical solutions of this application are applicable is first described.

Figure 1:
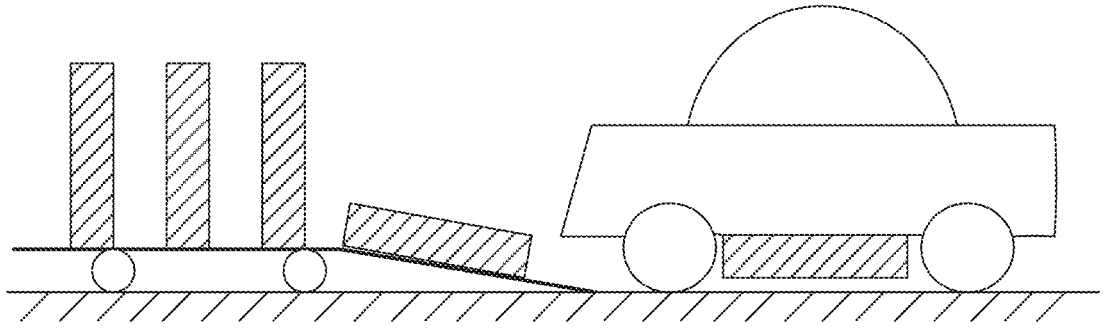
FIG. 1 is a schematic diagram of charging a vehicle by using a battery pack according to this application.
Figure 2:
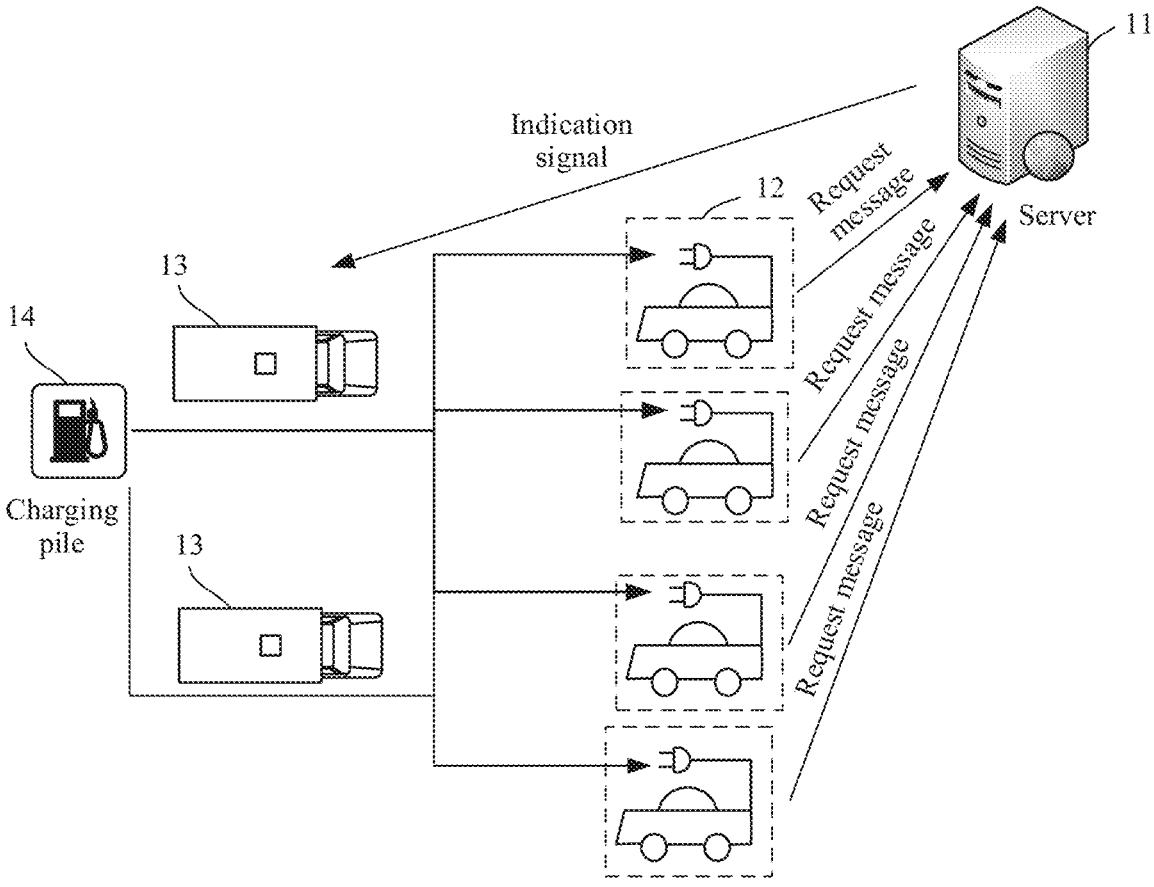
FIG. 2 is a schematic diagram of a structure of a mobile charging system according to an embodiment of this application.

The technical solutions of this application may be applied to a mobile charging system. As shown in FIG. 2, the system includes a server 11, at least one vehicle system 12, a mobile charging facility 13, a charging pile 14, and the like. Each vehicle system 12 may include a user 121, a terminal device 122, and a to-be-charged vehicle 123, as shown in FIG. 3. The vehicle 123 is a vehicle that needs to be charged and that is being driven by the user 121, and a holder of the terminal device 122 is the user 121.

The user 121 may be a driver. When the driver finds that power of the driven vehicle 123 is insufficient, the driver sends a request message to the server by using the terminal device 122, where the request message is used to request to charge the vehicle 123. Alternatively, the user 121 generates an order request on an app of the terminal device 122, and then sends the order request to the server 11.

The terminal device 122 may be a portable device, for example, an intelligent terminal, a mobile phone, a notebook computer, a tablet computer, a personal computer (PC), a personal digital assistant (PDA), a foldable terminal, a wearable device (for example, a smartwatch or a smart band) with a wireless communication function, a user device (user device) or user equipment (UE), or an augmented reality (AR) device or a virtual reality (VR) device. A specific device form of the terminal device is not limited in this embodiment of this application. In addition, the foregoing various terminal devices include but are not limited to a device using an IOS, Android, Microsoft, or another operating system.

The vehicle 123 is an electric vehicle (EV). The EV includes a display, an in-vehicle infotainment processor, and a communication module. In addition, the EV may further include another component or unit. This is not limited in this embodiment.

Optionally, in a possible implementation, the vehicle system 12 may not include the terminal device 122. A function of the terminal device 122 is implemented by the in-vehicle infotainment processor and the communication module in the EV. For example, after receiving an instruction triggered by a user, the in-vehicle infotainment processor sends a request message to the server 11 by using the communication module.

Refer to FIG. 2. The server 11 may receive a request message sent by one or more vehicle systems 12 and correspondingly generate one order based on each request message, then schedules at least one mobile charging facility 13 in a system based on order content and a quantity of orders, and dispatches a charging task to a corresponding mobile charging facility, to indicate the mobile charging facility to travel to a location of a user who sends the request message, and charge a vehicle of request. In addition, before scheduling and dispatching the charging task, the server 11 is further configured to: obtain road condition information, perform advanced driver assistance system (ADAS) computing based on the road condition information, generate a scheduling policy, and the like.

Optionally, the server 11 is a cloud server, and the cloud server may be a server, or a server cluster including a plurality of servers.

The mobile charging facility 13 is configured to: receive an indication signal sent by the server 11, travel to a location of a to-be-charged vehicle based on the indication signal, and charge the to-be-charged vehicle. After completing the charging task, the mobile charging facility 13 returns to the charging pile 14 to be charged. In addition, the mobile charging facility 13 is further configured to: report a current state of energy of a carried battery pack in real time in a process of executing the charging task, and report location information of the mobile charging facility 13 to the server 11 in real time in a travelling process, so that the server 11 can know about a status of each mobile charging facility in the system in real time, to provide a basis for subsequent charging task dispatching and electric energy resource scheduling.

In addition, each mobile charging facility 13 includes an in-vehicle infotainment processor, a communication module, a rechargeable battery, or a battery pack. There may be one or more battery packs. Each battery pack carries a specific state of energy. A quantity of battery packs and a state of energy of each battery pack are not limited in this embodiment.

In addition, the state of energy is a state of charge (SOC) of a battery in the battery pack.

Optionally, the mobile charging facility 13 may be an EV or a fuel vehicle.

In this embodiment, the mobile charging facility is a mobile charging vehicle carrying a battery pack, and a charging system includes at least two mobile charging vehicles.

In addition, the charging system may further include at least one roadside device, for example, a roadside unit, which is not shown in FIG. 2. Each roadside device is configured to periodically measure and report road condition information to the server 11, so that the server 11 plans a travelling route of the mobile charging facility based on the road condition information, generates an energy consumption map, and the like. The road condition information includes a state such as a traffic jam-free state, a road congestion state, or a road closure state, and may further include another road condition information, for example, information about an overpass or a tunnel. Details are not described in this embodiment.

In addition, optionally, in addition to an application scenario in which a private vehicle is charged, the technical solutions of this application may be further applied to application scenarios such as transportation of a container truck at a dock and preferential loading of a large-capacity loading truck.

An embodiment of this application provides a vehicle charging method, to improve utilization of electric energy of a charging system, and increase a throughput of the electric energy of the charging system. The method may be implemented by the server 11 in the foregoing mobile charging system.

Refer to FIG. 4. The method includes the following steps.

101: Obtain a status of a first battery pack in a first mobile charging facility.

The first mobile charging facility is a facility that returns to a charging pile after executing one charging task, and charges the first battery pack by using the charging pile. There may be one or more first battery packs. In addition, if a plurality of battery packs are included, each of the plurality of battery packs carries a same state of energy. For example, if the first battery pack includes two sub-battery packs, and a maximum state of energy of each sub-battery pack is 20 kWh (kilowatt-hour), a maximum state of energy that can be output by the first battery pack is 40 kWh.

The status of the first battery pack includes a charging state, a discharging state, and a fully charged state. In the charging state, at least one battery pack in the first mobile charging facility is obtaining electric energy. In the discharging state, at least one battery pack in the first mobile charging facility is releasing electric energy. In the fully charged state, each battery pack in the first mobile charging facility is at a maximum state of energy that can be accommodated by the battery pack, does not discharge to the outside, and does not obtain electric energy from the charging system.

In step 101, a possible implementation in which the server 11 obtains the status of the first battery pack includes:

First, states of energy of the first battery pack that are reported by the first mobile charging facility twice per unit time are obtained, and then a difference $\Delta Q$ between the states of energy at the two times is calculated, where $\Delta Q = Q1 - Q2$, Q1 is a state of energy of the first battery pack that is reported by the first mobile charging facility to the server at a first moment T1, Q2 is a state of energy of the first battery pack that is reported by the first mobile charging facility to the server at a second moment T2, where T1<T2, and a time interval $\Delta T = T1 - T2$; and if a change rate of the state of energy in the first battery pack is $\Delta Q/\Delta T > \delta$, $\delta$ is a preset value, and $\delta$ represents a change amount of the state of energy attenuated with time when the first battery pack is not discharged (still), it is determined that the first battery pack is being charged; or if $\Delta Q/\Delta T < \delta$, it is determined that the first battery pack is being discharged; or if $\Delta Q/\Delta T = \delta$, and $Q1 = Q2 = Q_{rated}$, it is determined that the first battery pack neither discharges to the outside nor charges from a power grid, and it may be inferred that the first battery pack is in the fully charged state. The $Q_{rated}$ indicates that the state of energy of the first battery pack reaches a rated state of energy. Optionally, the rated state of energy is a maximum state of energy that can be carried by the first battery pack.

Optionally, in another implementation of step 101, the first mobile charging facility determines a current status of the first battery pack, and then sends the status to the server by using an indication signal. For example, the first mobile charging facility and the server agree on an indication rule. When the server receives an indication signal that carries "1" and that is sent by the first mobile charging facility, it indicates that the first battery pack of the first mobile charging facility is in the charging state. When the server receives an indication signal that carries "0", it indicates that the first battery pack is in the discharging state. When the server receives an indication signal that carries "2", it indicates that the first battery pack is in the fully charged state. Specifically, a method in which the first mobile charging facility obtains the status of the first battery pack may be the same as or different from an implementation in which the server obtains the first battery pack. A specific implementation in which the first mobile charging facility obtains the status of the first battery pack is not limited in this embodiment.

In addition, in a process in which the first mobile charging facility actively reports the status of the first battery pack to the server, the first mobile charging facility may periodically report the status of the first battery pack, or report the status to the server when the status of the first battery pack changes.

102: If the first battery pack is in the charging state or the fully charged state, obtain a second state of energy sent by a second mobile charging facility. The second mobile charging facility is charging a first vehicle, and the second state of energy is a state of energy of a second battery pack in the second mobile charging facility.

The state of energy of the second battery pack is a sum of states of energy of at least one battery pack carried by the second mobile charging facility at a reporting moment. For example, the second mobile charging facility includes two sub-battery packs, and each sub-battery pack can carry a maximum of 20 kWh electric energy. If the server obtains, at the reporting moment, indication information sent by the second mobile charging facility, and the indication information includes that the state of energy of the second battery pack is 25 kWh, the server may infer that the second state of energy is 25 kWh, one of the two sub-battery packs is in full charge of 20 kWh, and the other sub-battery pack has a state of remaining energy of 5 kWh.

Step 102 includes: when the server detects that the first battery pack is in the charging state or the fully charged state, scanning all other mobile charging facilities that are near the first mobile charging facility and that are executing a charging task, for example, searching for another mobile charging facility by using a location of the first mobile charging facility as a circle center and a specific distance as a radius, and obtaining states of energy of battery packs of all the other mobile charging facilities in a coverage area. In this case, one or more mobile charging facilities that are executing a charging task may be found, that is, one or more second states of energy are obtained.

Optionally, that the first battery pack is in the charging state may be understood as that the state of energy of the first battery pack reaches a preset value. For example, the preset value is 80% to 90% of the maximum state of energy that can be carried by the first battery pack. That the first battery pack is in the charging state may be understood as that when the state of energy of the first battery pack that is being charged reaches 80% to 90% of the maximum state of energy that can be carried by the first battery pack, the first battery pack may be dispatched to execute a charging task.

103: Send a first indication signal to the first mobile charging facility when a first state of energy and the second state of energy meet a first preset condition, where the first indication signal is used to indicate the first mobile charging facility to charge the first vehicle, and the first state of energy is a state of energy of the first battery pack in the charging state or the fully charged state.

Specifically, if the first battery pack is in the charging state, the first state of energy is a state of energy that is of the first battery pack and that is sent by the first mobile charging facility to the server when the server obtains the status of the first battery pack. If the first battery pack is in the fully charged state, the server may directly obtain the first state of energy, and the first mobile charging facility does not need to report the state of energy of the first battery pack as the server knows in advance a maximum state of energy that can be carried by each mobile charging facility.

The maximum state of energy that can be carried by each mobile charging facility may be the same or may be different, depending on a quantity of battery packs carried by each mobile charging facility or energy density of each battery pack. In this embodiment, it is set that maximum states of energy that can be carried by all mobile charging facilities in the charging system are equal, that is, rated states of energy are the same.

That a first state of energy and the second state of energy meet a first preset condition includes: A first ratio is greater than or equal to a first threshold. The first ratio is a percentage of a difference between the first state of energy and the second state of energy in the first state of energy. Specifically, if the first state of energy is represented as Q1, the second state of energy is represented as Q2, the first ratio is $$\frac{Q1 - Q2}{Q1} \times 100\%,$$

and the first threshold is represented as P, it is determined whether $$\frac{Q1 - Q2}{Q1} \times 100\% \geq P$$

is met, and if the first preset condition is met, the first indication signal is sent to the first mobile charging facility. If the first preset condition is not met, the first indication signal is not sent.

A value of the first threshold P is related to a quantity of new orders generated per unit time. If the system detects that the quantity of new orders generated per unit time is increased, the first threshold P is adjusted to be increased; or if the quantity of orders generated per unit time is decreased, the first threshold P is adjusted to be decreased. The adjustment refers to increasing or decreasing the first threshold P based on an initial value. For example, the initial value of the first threshold P is $P_{initial}$, and the value of $P_{initial}$ may be freely set by the system.

In a possible implementation of step 103, if only one second mobile charging facility is charging the first vehicle in the searched coverage area, and it is determined that the second state of energy and the first state of energy that are reported by the second mobile charging facility meet the first preset condition, the step of sending the first indication signal to the first mobile charging facility is performed.

Alternatively, in another possible implementation, if two or more mobile charging facilities are charging their respective vehicles in the searched coverage area, and two or more of battery packs reported by the mobile charging facilities meet the first preset condition, for example, there are two mobile charging facilities: M1 and M2, and a state of energy of a battery pack carried in M1 is Q21, and a state of energy of a battery pack carried in M2 is Q22, and $$\frac{Q1 - Q21}{Q1} \times 100\% \geq P,$$

and $$\frac{Q1 - Q22}{Q1} \times 100\% \geq P,$$

a value of first ratio between M1 and M2 is compared, that is, a value of $$\frac{Q1 - Q21}{Q1} \times 100\%$$

is compared with a value of $$\frac{Q1 - Q22}{Q1} \times 100\%,$$

and a mobile charging facility with a larger first ratio is selected as the second mobile charging facility. In this example, it is assumed that $$\frac{Q1 - Q21}{Q1} \times 100\%$$

is greater than $$\frac{Q1 - Q22}{Q1} \times 100\%,$$

it is determined that the second mobile charging facility is M1, and then the foregoing step 103 continues to be performed. If the foregoing two first ratios are equal, either of the mobile charging facilities may be selected as the second mobile charging facility. For example, a mobile charging facility closest to the first mobile charging facility is selected as the second mobile charging facility. In this case, a vehicle charged by the second mobile charging facility is the first vehicle.

Optionally, in another possible implementation, if two or more mobile charging facilities in the searched coverage area are charging their respective vehicles, and states of energy two or more of battery packs reported by the mobile charging facilities meet the first preset condition, the server calculates a state of remaining energy of the battery pack after the first mobile charging facility reaches a location of each mobile charging facility that meets the first preset condition, and selects a mobile charging facility with a larger state of remaining energy in a battery pack as the second mobile charging facility to be replaced. In other words, when the first mobile charging facility reaches at least one to-be-selected mobile charging facility, a mobile charging facility whose state of remaining energy is the maximum after power consumed on a traveling path is subtracted is selected as the second mobile charging facility.

For example, for the to-be-selected mobile charging facilities M1 and M2, states of energy of the battery packs of the M1 and M2 both meet the first preset condition, that is, $$\frac{Q1 - Q21}{Q1} \times 100\% \geq P,$$

$$\frac{Q1 - Q22}{Q1} \times 100\% \geq P,$$

and $$\frac{Q1 - Q21}{Q1} \times 100\%$$

is greater than $$\frac{Q1 - Q22}{Q1} \times 100\%.$$

Then, a state of remaining energy of the battery pack when the first mobile charging facility reaches a location of a mobile charging facility corresponding to Q21 is calculated, where the state of remaining energy is represented as $Q_{remaining1}$, $Q_{remaining1} = Q1 - Q21 - Q_{S1}$, and $Q_{S1}$ is a state of energy consumed by the first mobile charging facility by passing through a path S1 when the first mobile charging facility travels from the current location to the location of the mobile charging facility corresponding to Q21. Similarly, a state of remaining energy of the battery pack when the first mobile charging facility reaches a location of a mobile charging facility corresponding to Q22 is calculated, where the state of remaining energy is represented as $Q_{remaining2}$, $Q_{remaining2} = Q1 - Q22 - Q_{S2}$, and $Q_{S2}$ a state of energy consumed by the first mobile charging facility by passing through a path S2 when the first mobile charging facility travels from the current location to the location of the mobile charging facility corresponding to Q22. Values of the two states of remaining energy are compared. If $Q_{remaining2} > Q_{remaining1}$, that is $$\frac{Q_{remaining2}}{Q1} > \frac{Q_{remaining1}}{Q1},$$

and $Q_{remaining}/Q1$ is a second ratio, the mobile charging facility M2 corresponding to a larger state of remaining energy $Q_{remaining2}$ (or the second ratio) is selected as the second mobile charging facility. The power on each path may be obtained by using an energy consumption map obtained after simulation calculation is performed.

It should be understood that the server may further determine M1 and M2 by using another method. For example, the server determines, based on a principle of a shortest distance, compares distances between the mobile charging facilities M1 and M2 and the first mobile charging facility, and selects one closest to the first mobile charging facility as the second mobile charging facility.

Optionally, in the foregoing step 103, the method further includes: if there is no second mobile charging facility meeting the first preset condition in the searched coverage area, increasing the searching radius and expanding the searching range, until a second mobile charging facility meeting the first preset condition is found by scanning, and then performing the foregoing step 103.

In addition, the method further includes: The server sends a location and a travelling path of the second mobile charging facility to the first mobile charging facility; after receiving the information, the first mobile charging facility travels to the location of the second mobile charging facility based on an indication of the location and the travelling path, to continue charging the first vehicle.

In this case, the method further includes: The server sends a second indication signal to the second mobile charging facility, where the second indication signal is used to indicate the second mobile charging facility to stop charging the first vehicle, and return to the charging pile to be charged. Specifically, the server may send the second indication signal when the first mobile charging facility just reaches the location of the first vehicle; or the server sends the second indication signal when sending the first indication signal in step 103. This embodiment does not limit specific time for sending the second indication signal.

According to the method provided in this embodiment, when it is detected that a battery pack of a mobile charging facility is in a charging state or a fully charged state, a charging indication signal is sent to the mobile charging facility, so that the mobile charging facility executes a charging task in the charging state or once the mobile charging facility reaches the fully charged state. A replaced mobile charging facility returns to be charged. This prevents the mobile charging facility in the fully charged state from waiting in place for the server to deliver a new charging task, eliminates time for the mobile charging facility to wait in place, and improves a throughput and charging efficiency of electric energy of the charging system.

The throughput is a sum of absolute values of a state of charged energy and a state of discharged energy of battery packs in all mobile charging facilities in the charging system. For example, if the mobile charging facility M1 discharges $\square Q$ within a unit time period, and the mobile charging facility M2 charges $-\square Q$ within a unit time period, a throughput of the system within the unit time period is $2\square Q$.

It should be noted that, in the charging system, two or more mobile charging facilities may be in the charging state or the fully charged state at a same time. In this case, the server only needs to dispatch one or more mobile charging facilities that meet the first preset condition to replace one mobile charging facility that is being charged, so that waiting time of the mobile charging facility that is currently in the charging state or the fully charged state can be reduced, and the replaced mobile charging facility is charged from the system. In this way, a quantity of charging and discharging times of the charging system per unit time is increased, and a throughput of electric energy of the system is increased.

In this embodiment, before step 101, the method further includes a process in which the server determines the second mobile charging facility, and indicates the second mobile charging facility to charge the first vehicle. Specifically, as shown in FIG. 5, the method includes the following steps.

201: Receive a first request message sent by a first terminal device, where the first request message is used to request to charge the first vehicle.

In addition, the first request message further includes a state of energy that the first terminal device requests to provide to charge the first vehicle.

202: Determine the second mobile charging facility based on a location and a state of energy of a battery pack of each mobile charging facility in the charging system, and an energy consumption map, where the energy consumption map includes at least one path from a location of each mobile charging facility to a location of the first vehicle, and a power consumption status on each path.

Figure 6:
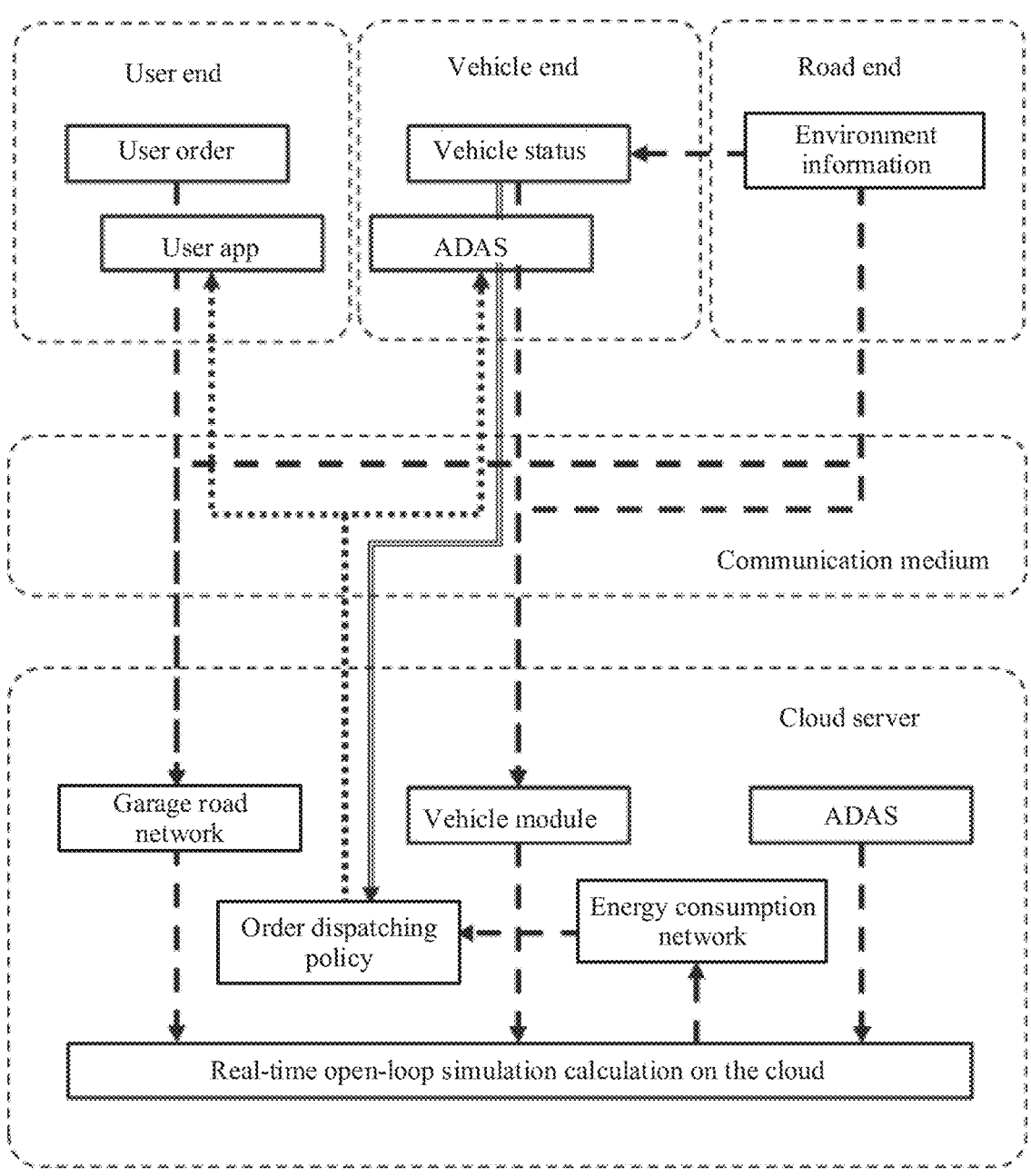
FIG. 6 is a flowchart of system architecture information exchange according to an embodiment of this application.

For example, FIG. 6 is a flowchart of system architecture information exchange according to an embodiment. The server is a cloud server, the first terminal device is a user end, the first vehicle is a vehicle end, and a dashed line represents a normal scheduling flow of the mobile charging facility.

First, on a user side, a user generates a user order by using a user app of the first terminal device, and then transmits the user order to the cloud server by using a communication medium, for example, transmits the user order to a garage road network model on the cloud. In addition, a road end side (for example, a roadside unit) reports environment information to the garage road network model of a cloud server. The environment information includes a condition such as a road congestion condition, a traffic jam-free condition, and a road maintenance condition. The vehicle end, for example, the first vehicle, further reports its vehicle status information to a vehicle model of the cloud server. The vehicle status information includes an availability indicator of the vehicle, such as a battery temperature and a battery level.

Then, after receiving information reported by each end, the cloud server performs simulation calculation based on the obtained information. For example, the cloud server completes full-process simulation calculation on a simulated road by using an ADAS via a simulated vehicle model, to obtain an energy consumption map (or referred to as an energy consumption network). For an energy consumption map, refer to FIG. 7. The energy consumption map includes environment information and a power consumption status of each path.

Finally, the cloud server calculates, based on a current road network status, all pass-through paths from all mobile charging facilities that can receive a charging task to the location of the first vehicle, and the power consumption status on each path, to determine the second mobile charging facility.

Specifically, the cloud server searches, from all mobile charging facilities that can receive the charging task, one that is at a maximum state of energy in a battery pack and has least power consumption on a path when the first vehicle is reached as the second mobile charging facility.

203: Send a third indication signal to the second mobile charging facility, where the third indication signal is used to indicate the second mobile charging facility to charge the first vehicle.

In addition, the method further includes: when an unexpected fault occurs in the process of executing the charging task by the second mobile charging facility, immediately ending the current charging task, and restarting, by the cloud server, order dispatching. As shown in FIG. 6, double thin solid lines represent a special procedure such as an unexpected fault.

Figure 7:
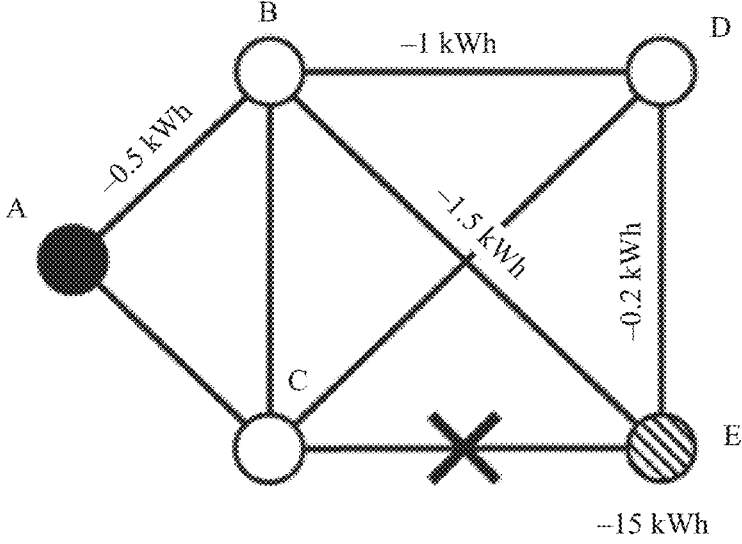
FIG. 7 is a schematic diagram of an energy consumption map according to an embodiment of this application.

In an example shown in FIG. 7, a node A represents a mobile charging facility in a current fully charged state, for example, for the first mobile charging facility, a node E represents a to-be-charged vehicle, that is, the location of the first vehicle, and nodes B, C, and D represent nodes at intersections of a plurality of roads. A road between the node C and the node E cannot be passed through due to temporary construction. In this case, the server needs to update a road network structure in real time, so that the cloud server calculates, based on a current road network status and energy consumption map, one having least power consumption of all paths from the mobile charging facility to the location of the first vehicle. Each node in the energy consumption map is a power consumption requirement of a user, and a path weight is a topology of power consumption during travelling of the mobile charging facility. A mobile charging facility that can receive a task includes: an idle mobile charging facility, or a mobile charging facility in a fully charged state.

In the example in FIG. 7, there are at least two passable paths from the node A to the node E at the location of the first vehicle of the user order. For example, a first path starts from the node A, passes through the node B and the node D in sequence, and finally reaches the node E. A second path starts from the node A, passes through the node B, and then reaches the node E.

A length of the first path is d1, where $d1=d_{AB}+d_{BD}+d_{DE}$. A length of the first path is d2, where $d2=d_{AB}+d_{BE}$. $d_{AB}$ represents a distance between the node A and the node B, $d_{BD}$ represents a distance between the node B and the node D, $d_{DE}$ represents a distance between the node D and the node E, and $d_{BE}$ represents a distance between the node B and the node E. d1 and d2 are compared to obtain d1<d2, that is, the first length is less than the second length.

Power consumption statuses on the first path and the second path are separately calculated, and a state of energy that needs to be consumed on the first path is 1.7 kWh, where 1.7 kWh=(0.5+1+0.2) kWh. Similarly, a state of energy that needs to be consumed on the second path is 2 kWh, where 2 kWh=(0.5+1.5) kWh, and 1.7 kWh<2 kWh. In this case, power consumed by the mobile charging facility for travelling on the first path is less than power consumed on the second path. The first path is selected, based on a principle of least power consumption, as a path for the mobile charging vehicle to travel to the first vehicle.

It should be understood that, in a process of selecting a travelling path, because a path is open to the air and is not blocked, sunlight light is strong. Compared with a path with a shade or not directly exposed to the sun, this path increases power consumption of a battery pack of a mobile charging facility. Therefore, a path with a shortest distance does not often lead to least power consumption.

In this embodiment, a relatively short-distance path is discarded, and a path with least power consumption is selected as an optimal path for the mobile charging facility to reach the to-be-charged vehicle, so that when the mobile charging facility reaches the to-be-charged vehicle, a state of remaining energy is large, and more electric energy can be provided for the to-be-charged vehicle.

Optionally, if the mobile charging facility does not consume electric energy on the traveling path, for example, a fuel vehicle or a mobile charging vehicle that is independently powered, and does not consume energy of a battery pack, the shortest path may be selected as the traveling path of the second mobile charging facility. A specific process is not described in detail in this embodiment.

In addition, the foregoing method further includes: The server sends identity document (ID) information of the first mobile charging facility to the first terminal device, for example, the ID information includes a license plate number, an order number, location information, and the like of the first mobile charging facility, so that the user learns, by using the first terminal device, that a system of the first mobile charging facility has received an order, and assigns the mobile charging facility to provide a charging service for the first vehicle.

According to the method provided in this embodiment, the server obtains information reported by the user end, the vehicle end, and the road end, updates the road network structure in real time, calculates the energy consumption map, generates a scheduling policy of at least one mobile charging facility based on the energy consumption map, and dispatches a charging task, so that when a mobile charging facility that receives the charging task travels to a location of a to-be-charged vehicle, electric energy consumption is least, and a state of remaining energy is maximum. In this way, more electric energy is provided for the to-be-charged vehicle.

In addition, an energy consumption value obtained by performing vehicle-level simulation calculation on a cloud server side is more reliable (in consideration of impact of an ambient temperature on a vehicle). A road passable status updated by using the road end in real time helps enhance intelligence of system scheduling, and route planning based on the energy consumption map helps reduce electric energy consumption of a battery on a travelling path.

Figure 8:
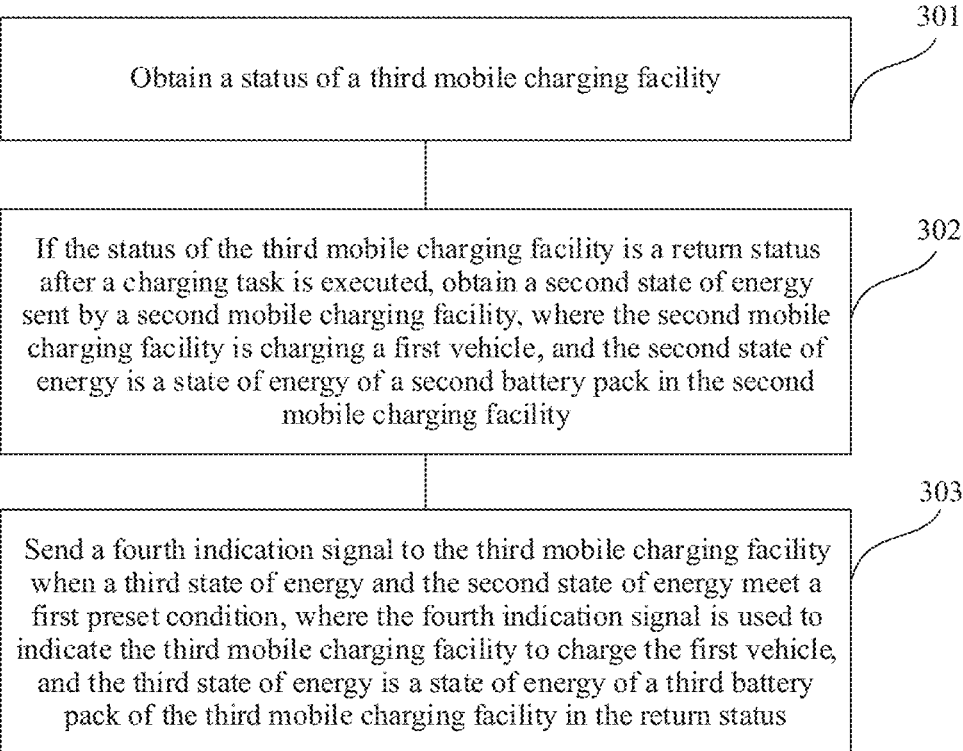
FIG. 8 is a flowchart of another vehicle charging method according to an embodiment of this application.

Another embodiment of this application further provides a vehicle charging method. As shown in FIG. 8, the method includes the following steps.

301: Obtain a status of a third mobile charging facility.

The status of the third mobile charging facility includes a travelling state and a still state. The travelling state includes a state in which the third mobile charging facility receives a charging task and travels to a to-be-charged vehicle, and a state in which the third mobile charging facility returns to be charged after executing the charging task. The still state includes a charging state, a discharging state, and a fully charged state of a third battery pack of the third mobile charging device.

Specifically, a server may obtain the travelling state or the still state of the third mobile charging facility by using a positioning technology. For example, the server locates and tracks a location and a direction of the third mobile charging facility in real time, for example, by using a GPS positioning technology. In addition, a method for obtaining a status of the third battery pack in the still state is the same as that in the foregoing embodiment. For details, refer to the description in the foregoing embodiment. Details are not described herein again.

302: If the status of the third mobile charging facility is a return status after the charging task is executed, obtain a second state of energy sent by a second mobile charging facility, where the second mobile charging facility is charging a first vehicle, and the second state of energy is a state of energy of a second battery pack in the second mobile charging facility.

For example, at a moment when the third mobile charging facility returns, the server sends an indication signal to the second mobile charging facility, to indicate the second mobile charging facility to report a current second state of energy of the second battery pack; or the server receives, at a time point of a preset reporting period, the second state of energy reported by the second mobile charging facility.

303: Send a fourth indication signal to the third mobile charging facility when a third state of energy and the second state of energy meet a first preset condition, where the fourth indication signal is used to indicate the third mobile charging facility to charge the first vehicle, and the third state of energy is a state of energy of the third battery pack of the third mobile charging facility in the return status.

That a third state of energy and the second state of energy meet a first preset condition includes: A second ratio is greater than or equal to a first threshold; and the third ratio is a percentage of a difference between the third state of energy and the second state of energy in the third state of energy. For example, the third state of energy is represented as Q3, the second state of energy is represented as Q2, the third ratio is $$\frac{Q3 - Q2}{Q3} \times 100\%,$$

and the first threshold is P. If $$\frac{Q3 - Q2}{Q3} \times 100\% \geq P$$

is met, the first preset condition is met. If $$\frac{Q3 - Q2}{Q3} \times 100\% < P,$$

the first preset condition is not met. The first threshold may be system-defined.

For example, it is obtained at a detection moment that the third state of energy Q3 of the third battery pack is 20 kWh, the second state of energy Q2 of the second mobile charging facility is 15 kWh, and the second ratio is $$\frac{20 - 15}{20} \times 100\% = 25\%.$$

If the first threshold is set to 20%, the second ratio 25% is greater than 20%, and the first preset condition is met. The fourth indication signal is sent to the third mobile charging facility, to indicate the third mobile charging facility to replace the second mobile charging facility and continue charging the first vehicle.

In addition, after the foregoing step 103, the method further includes: sending a fifth indication signal to the second mobile charging facility, where the fifth indication signal is used to indicate the second mobile charging facility to return to be charged.

Optionally, before obtaining the status of the third mobile charging facility, the method further includes: receiving a first request message sent by a first terminal device, where the first request message is used to request to charge the first vehicle; determining the second mobile charging facility based on a location and a state of energy of a battery pack of each mobile charging facility in a charging system, and an energy consumption map, where the energy consumption map includes at least one path from a location of each mobile charging facility to a location of the first vehicle, and a power consumption status on each path; and sending a sixth indication signal to the second mobile charging facility, where the sixth indication signal is used to indicate the second mobile charging facility to charge the first vehicle.

For a more specific process of determining the second mobile charging facility and sending the sixth indication signal, refer to the description in the foregoing embodiment. Details are not described in this embodiment again.

In addition, this embodiment further includes a step of selecting and determining, by the charging system, the second mobile charging facility to charge the first vehicle. A specific selection and determining method is the same as that in the foregoing embodiment. For details, refer to the description in the foregoing embodiment. Details are not described herein again.

According to the method provided in this embodiment, a state of energy of a mobile charging facility in a return status after one charging task is executed is screened, and when a preset condition is met, the mobile charging facility is dispatched to replace another mobile charging facility that is executing the charging task, so as to indicate the replaced mobile charging facility to return to be charged. Because the state of energy of the dispatched mobile charging facility is greater than the state of energy of the mobile charging facility that is executing the charging task, more electric energy can be provided for a vehicle after the replacement, and a battery pack of the replaced mobile charging facility is quickly charged, so as to provide a service for a new order request.

In addition, in this embodiment, a throughput of power of the charging system is further increased, and charging efficiency is improved.

In a specific embodiment, it is assumed that the charging system includes two mobile charging facilities: a mobile charging vehicle A1 and a mobile charging vehicle A2, and further includes a server, a roadside unit, at least two to-be-charged vehicles, a user terminal device, and the like. The terminal device may be a mobile phone terminal.

In an initial condition, battery packs of the mobile charging vehicle A1 and the mobile charging vehicle A2 are both fully charged and in an idle state. In the fully charged state, rated states of energy of the battery packs of the mobile charging vehicle A1 and the mobile charging vehicle A2 are 40 kWh (kilowatt-hour). For example, each mobile charging vehicle includes two sub-battery packs, and each sub-battery pack can carry a maximum state of energy of 20 kWh. In this case, a maximum state of energy that can be carried by each mobile charging vehicle is 40 kWh. In this case, a state of total energy of the charging system is a sum of states of energy carried by two mobile charging vehicles, that is, 80 kWh.

The following uses time as a node to describe in detail the vehicle charging method provided in this embodiment.

Figure 9:
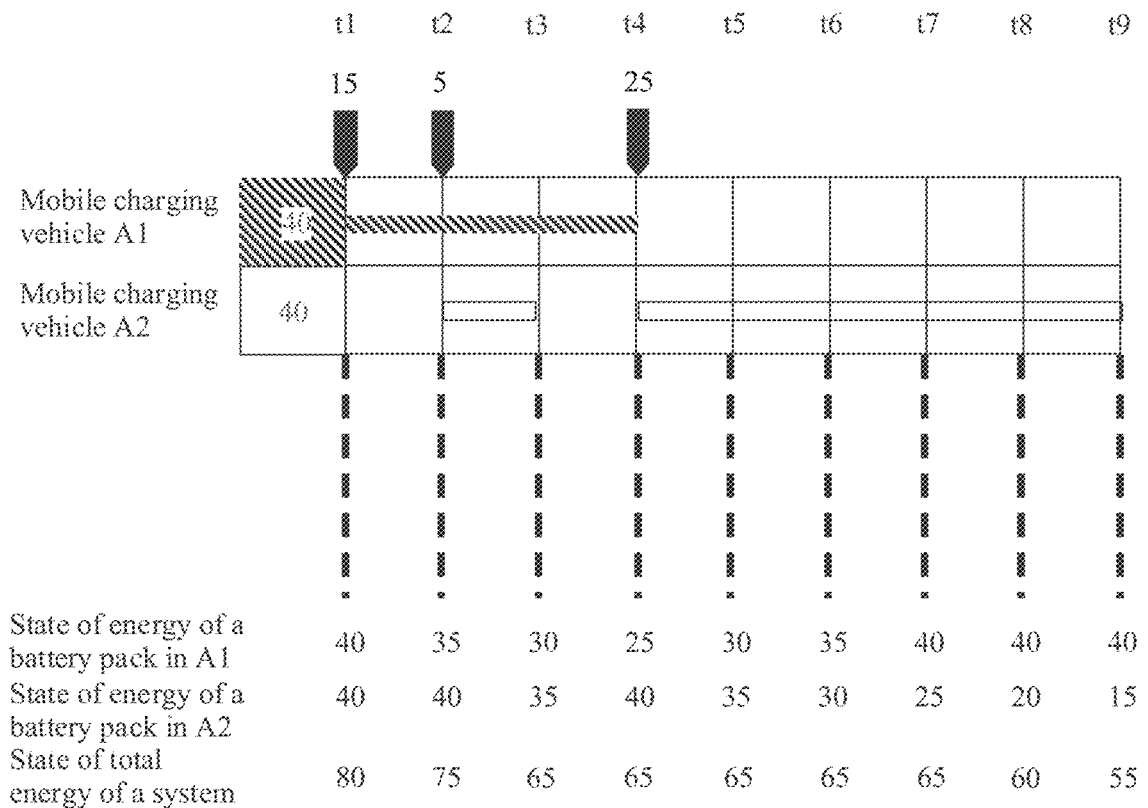
FIG. 9 is a schematic diagram of power consumption of a charging system according to an embodiment of this application.

As shown in FIG. 9, at a moment t1: A server receives, at the moment t1, a first request message sent by a user 1 by using a mobile phone app, where the first request message is used to request to provide a state of energy of 15 kWh for a vehicle 1. Optionally, the first request message is an order request. The server determines, based on an energy consumption map at the moment t1 and statuses of mobile charging vehicles A1 and A2, to dispatch the mobile charging vehicle A1 to execute a charging task of the first request message. For a specific selection process, refer to the descriptions of steps 201 to 203 in the foregoing embodiment, and details are not described herein again. The mobile charging vehicle A1 receives an indication signal sent by the server, and travels to a location of the vehicle 1 to charge the vehicle 1.

It should be noted that, for ease of calculation and description, in this embodiment, it is assumed that the mobile charging vehicle does not consume electric energy on a traveling path. For example, if the mobile charging vehicle A1 and the mobile charging vehicle A2 are fuel vehicles, power of the battery pack is not consumed in a traveling process. Alternatively, in another possible implementation, each mobile charging vehicle has an independent power supply unit configured to supply power for a travel distance, and the mobile charging vehicle is separated from a battery pack carried in the mobile charging vehicle. Therefore, power consumed by A1 and A2 in the traveling process does not affect power of the mobile battery pack.

In this case, a state of total energy of the charging system at the moment t1 is 80 kWh.

At a moment t2: The server receives a second request message sent by a user 2 by using the mobile phone app, where the second request message is used to request to provide a state of energy of 5 kWh for a vehicle 2, and the server delivers an indication signal to the mobile charging vehicle A2, to dispatch the mobile charging vehicle A2 to charge the vehicle 2. After receiving the indication signal, A2 travels to a location of the vehicle 2 and charges the vehicle 2.

In addition, within a time period from t1 to t2, the mobile charging vehicle A1 continuously charges the vehicle 1. It is assumed that a battery pack of A1 discharges 5 kWh within the time period, and at the moment t2, there is a state of remaining energy of 35 kWh in the battery pack of A1. In this case, a state of total energy of the charging system is 75 kWh.

At a moment t3: A1 and A2 continuously supply power to the vehicle 1 and the vehicle 2, and within a time period from t2 to t3, A1 and A2 each discharge 5 kWh. At the moment t3, a state of energy in a battery pack of A1 is 30 kWh, and a state of energy in a battery pack of A2 is 35 kWh. In this case, a state of total energy of the charging system is 65 kWh.

In addition, at the moment t3, A2 completes a charging task of the vehicle 2, returns to a charging pile to be charged, and receives, on a return path, an indication signal sent by the server, where the indication information is used to indicate A2 to charge the vehicle 1 and replace A1 that is charging the vehicle 1. Because the server detects that at the moment t3, a state of energy (35 kWh) of a battery pack of A2 is greater than a state of energy (30 kWh) of A1 and exceeds a first threshold, the replaced mobile charging vehicle A1 returns to the charging pile to be charged.

At a moment t4: A1 is charged 5 kWh at the charging pile, and a corresponding battery pack has a state of energy of 35 kWh. A battery pack of A2 discharges 5 kWh, and a state of remaining energy is 30 kWh. In this case, a state of total energy of the charging system is 65 kWh. A2 completes a charging task of the first request message, and returns the charging pile to charge the battery pack.

In addition, at the moment t4, the method further includes: The server receives at the moment t4, a third request message sent by a user 3, where the third request message is used to request to provide a state of energy of 25 kWh for a vehicle 3. In this case, the server detects that the battery pack of A2 carries a state of energy of 30 kWh that is greater than a state of energy of 25 kWh of an order request. Then, the server dispatches A2 to execute a charging task of the third request message, and then A2 travels to a location of the user 3 based on an indication signal sent by the server and charges the vehicle 3.

At a moment t5: The battery pack of A1 is already in a fully charged state, and a state of energy of a battery pack that is charging the vehicle 3 is 25 kWh. It is assumed that the first threshold is 20%, and a first ratio is calculated to be (40–25)/40·100%=37.5% that is greater than the first threshold 20%, the first preset condition is met. In this case, A1 is dispatched by the server to charge the vehicle 3, and A2 is indicated to return to the charging pile. In this case, a state of energy of the battery pack of A1 is 40 kWh, a state of remaining energy after the battery pack of A2 discharges 5 kWh is 25 kWh, and a state of total energy of the charging system is 65 kWh.

At a moment t6: When A1 charges the vehicle 3, and a state of energy of the battery pack of A1 is decreased from 40 kWh to 35 kWh, A2 obtains a state of energy of 5 kWh from the charging pile within a time period from t5 to t6, and the state of energy of the battery pack of A2 is increased from 25 kWh to 30 kWh. In this case, a state of total energy of the charging system is 65 kWh.

At the moment t6, the battery pack of A1 is in a discharging state, and the battery pack of A2 is in a charging state.

At a moment t7: When A1 continues to charge the vehicle 3, and a state of energy of the battery pack of A1 is decreased from 35 kWh to 30 kWh, A2 continues to obtain a state of energy of 5 kWh from the charging pile within a time period from t6 to t7, and the state of energy of the battery pack of A2 is increased from 30 kWh to 35 kWh. In this case, a state of total energy of the charging system is 65 kWh.

At a moment t8: When A1 continues to charge the vehicle 3, and a state of energy of the battery pack of A1 is decreased from 30 kWh to 25 kWh, A2 continues to obtain a state of energy of 5 kWh from the charging pile within a time period from t7 to t8, and the state of energy of the battery pack of A2 is increased from 35 kWh to 40 kWh. In this case, a state of total energy of the charging system is 65 kWh, and the battery pack of A2 is in a fully charged state.

At the moment t8, when the battery pack of A2 is fully charged to 40 kWh, a state of energy of the battery pack of A1 is 25 kWh, and the first ratio is calculated to be (40–25)/40·100%=37.5% that is greater than the first threshold 20%, the first preset condition is met. In this case, A2 is dispatched to replace A1 to charge the vehicle 3, and A1 returns to the charging pile after being replaced.

At a moment t9: When A2 charges the vehicle 3, and a state of energy of the battery pack of A1 is decreased from 40 kWh to 35 kWh, A1 obtains a state of energy of 5 kWh from the charging pile within a time period from t7 to t8, and the state of energy of the battery pack of A1 is increased from 25 kWh to 30 kWh. In this case, a state of total energy of the charging system is 65 kWh.

At the moment t9, A2 completes a task of charging the vehicle 3, and then returns to the charging pile to wait for a new order request.

Figure 10:
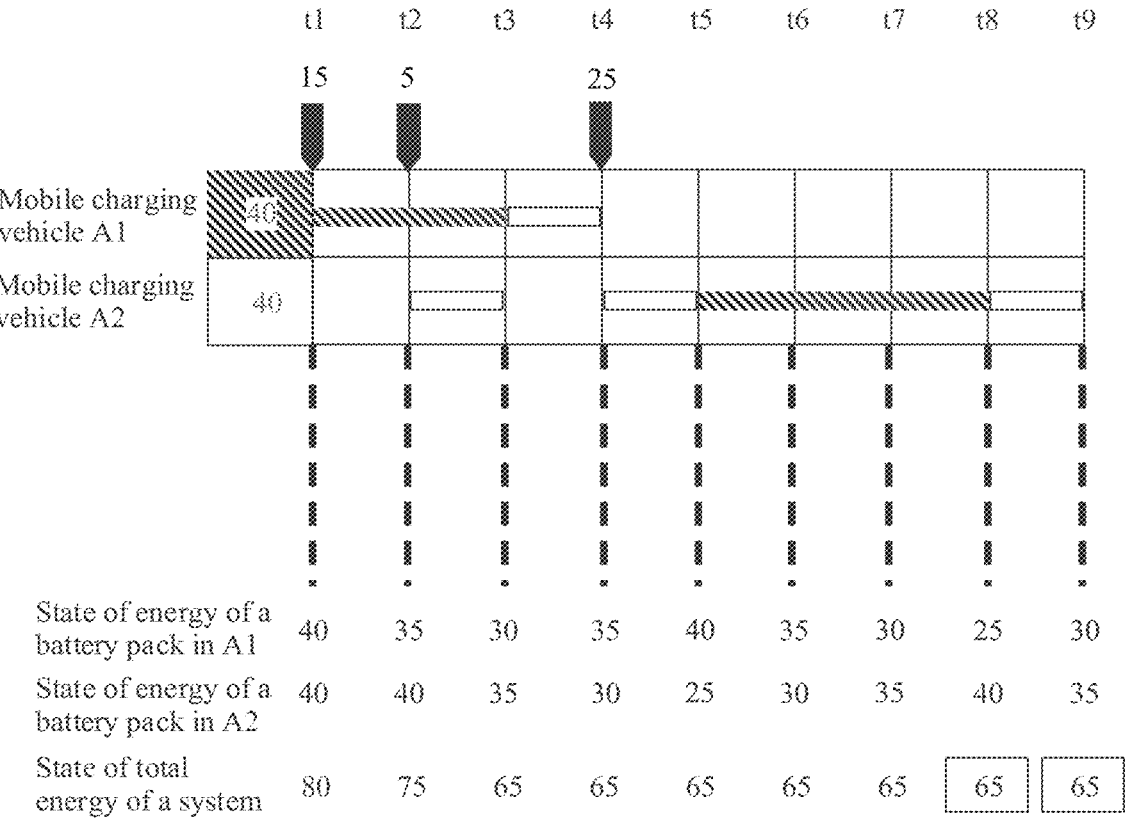
FIG. 10 is a schematic diagram of power consumption of another charging system according to an embodiment of this application.

In this embodiment, it is assumed that a charging rate and a discharging rate of a battery pack are consistent, and time on a path is negligible compared with charging time and discharging time of the battery pack, this increases a throughput of electric energy of a charging system in comparison with a common charging method. Specifically, FIG. 10 shows a scheduling method for generally charging a vehicle. Similarly, a system receives an order request at a moment t1, a moment t2, and a moment t5. Within a time period from t7 to t9, a battery pack of A1 is fully charged and stays at a charging pile, and a battery pack of A2 continuously discharges, to provide a charging service for the vehicle 3.

As shown in FIG. 9, at a moment t8, a state of energy of a battery pack of A1 is 40 kWh, and a state of energy of a battery pack of A2 is 20 kWh. In this case, a state of total energy of the charging system is 60 kWh. However, according to the vehicle charging method provided in this embodiment, as shown in FIG. 10, at the moment t8, the state of total energy of the charging system is 65 kWh, and therefore, the state of energy of the charging system is increased by 5 kWh. At a moment t9, a state of total energy of the charging system corresponding to FIG. 10 is 55 kWh. In this case, only the battery pack of A2 is charging the vehicle, and the battery pack of A1 waits for a new order request after being fully charged. However, according to the method in this application, at the moment t9, the battery pack of A2 is in a discharging process, and the battery pack of A1 is in a charging state, to obtain extra 10 kWh from a power grid. Therefore, at the same moment, the state of energy of the system is increased by 10 kWh. In this case, at the moment t8 and the moment t9, the state of energy of the charging system is increased by 15 kWh in total. Therefore, the charging method provided in this embodiment can finally increase state of energy output of 15 kWh of the power grid.

In addition, at the moment t9, a state of total energy of battery packs in the mobile charging vehicles A1 and A2 in this embodiment is greater than a sum of states of energy of battery packs in the conventional method. This means that when the server receives a new user order, A1 and A2 have a stronger charging service capability.

In addition, for comparison of system throughputs, a time interval between two adjacent moments is the same, and battery pack charging efficiency and battery pack discharging efficiency are also the same. For example, as shown in FIG. 10, within the time period from t1 to t2, the battery pack of the mobile charging vehicle A1 discharges 5 kWh, and the state of energy of the mobile charging vehicle A2 remains unchanged, and therefore, the system throughput is 5 kWh. Similarly, within the time period from t7 to t8, the battery pack of the mobile charging vehicle A1 discharges 5 kWh, and the battery pack of the mobile charging vehicle A2 is charged 5 kWh, and therefore, the system throughput is 10 kWh. Compared with the system throughput of 5 kWh within the time period t7 to t8 shown in FIG. 9, the throughput is increased by 5 kWh. Similarly, the system throughput within the time period from t8 to t9 is 10 kWh, which is also 5 kWh greater than the system throughput within the same time period shown in FIG. 9.

The following describes an apparatus embodiment corresponding to the foregoing method embodiments.

Figure 11:
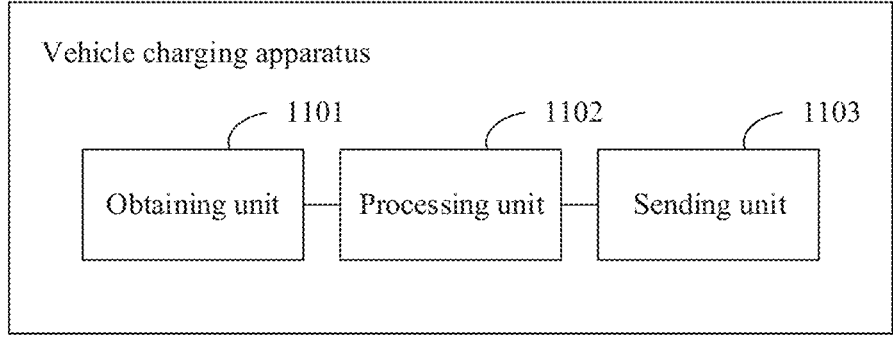
FIG. 11 is a schematic diagram of a structure of a vehicle charging apparatus according to an embodiment of this application.

FIG. 11 is a schematic diagram of a structure of a vehicle charging apparatus according to an embodiment of this application. The apparatus may be an electronic device, or a component located in the electronic device, for example, a chip. In addition, the apparatus may implement the vehicle charging method in the foregoing embodiment.

Specifically, as shown in FIG. 11, the apparatus may include an obtaining unit 1101, a processing unit 1102, and a sending unit 1103. In addition, the apparatus may further include other units or modules such as a storage unit.

The processing unit 1102 is configured to obtain a status of a first battery pack in a first mobile charging facility, and detect whether the first battery pack is in a charging state or a fully charged state. The obtaining unit 1101 is configured to: when the processing unit detects that the first battery pack is in the charging state or the fully charged state, obtain a second state of energy sent by a second mobile charging facility, where the second mobile charging facility is charging a first vehicle, and the second state of energy is a state of energy of a second battery pack in the second mobile charging facility. The processing unit 1102 is further configured to detect whether a first state of energy and the second state of energy meet a first preset condition, where the first state of energy is a state of energy of the first battery pack in the charging state or the fully charged state. The sending unit 1103 is configured to: when the processing unit detects that the first state of energy and the second state of energy meet the first preset condition, send a first indication signal to the first mobile charging facility, where the first indication signal is used to indicate the first mobile charging facility to charge the first vehicle.

That a first state of energy and the second state of energy meet a first preset condition includes: A first ratio is greater than or equal to a first threshold, and the first ratio is a percentage of a difference between the first state of energy and the second state of energy in the first state of energy.

Optionally, in a possible implementation of this embodiment, the sending unit 1103 is further configured to send a second indication signal to the second mobile charging facility, where the second indication signal is used to indicate the second mobile charging facility to return to be charged.

Optionally, in another possible implementation of this embodiment, the processing unit 1102 is further configured to: before the second state of energy sent by the second mobile charging facility is obtained, and if it is detected that one mobile charging facility in a charging system is charging a vehicle, determine that the mobile charging facility is the second mobile charging facility; or if two or more mobile charging facilities in a charging system are charging a vehicle, determine that the second mobile charging facility is one having a maximum first ratio in the two or more mobile charging facilities.

Optionally, in still another possible implementation of this embodiment, the processing unit 1102 is further configured to: if it is detected that two or more mobile charging facilities in a charging system are charging a vehicle, determine that the second mobile charging facility is one having a maximum second ratio in the two or more mobile charging facilities.

The second ratio is a percentage of a state of remaining energy in a battery pack of the first mobile charging facility in the first state of energy, the state of remaining energy is represented as $Q_{remaining}$, $Q_{remaining}=Q1-Q2-Q_S$, Q1 represents the first state of energy, Q2 represents the second state of energy, and $Q_S$ represents a state of energy consumed on a path when the first mobile charging facility travels from a current location to a location of a mobile charging facility corresponding to Q2.

Optionally, in still another possible implementation of this embodiment, the obtaining unit 1101 is further configured to: before the status of the first battery pack in the first mobile charging facility is obtained, receive a first request message sent by a first terminal device, where the first request message is used to request to charge the first vehicle. The processing unit 1102 is further configured to determine the second mobile charging facility based on a location and a state of energy of a battery pack of each mobile charging facility in the charging system, and an energy consumption map, where the energy consumption map includes at least one path from a location of each mobile charging facility to a location of the first vehicle, and a power consumption status on each path. The sending unit 1103 is further configured to send a third indication signal to the second mobile charging facility, where the third indication signal is used to indicate the second mobile charging facility to charge the first vehicle.

Optionally, in still another possible implementation of this embodiment, when the second mobile charging facility is determined, that is, when a mobile charging facility having the maximum second ratio or the maximum state of remaining energy in the battery pack is selected, the processing unit 1102 is further configured to: detect whether the mobile charging facility having the maximum second ratio or the maximum state of remaining energy meets an availability indicator, for example, determine whether a battery temperature of the mobile charging facility is lower than a warning value. If the battery temperature is lower than the warning value, it is proved that the availability indicator of the mobile charging facility is met, and it is further determined that the mobile charging facility is the second mobile charging facility. If the battery temperature is higher than or equal to the warning value, it is indicated that the availability indicator of the mobile charging facility is unqualified, a mobile charging facility having a $2^{nd}$ highest second ratio is selected, and availability indicator determining is performed, until a mobile charging facility that meets the availability indicator and has a high state of energy in a battery pack is selected.

In addition, in the vehicle charging apparatus, the obtaining unit 1101 is further configured to obtain a status of a third mobile charging facility. The processing unit 1102 is further configured to: if it is detected that the status of the third mobile charging facility is a return status after a charging task is executed, obtain, by using the obtaining unit, a second state of energy sent by a second mobile charging facility, and detect whether a third state of energy and the second state of energy meet a first preset condition, where the second mobile charging facility is charging a first vehicle, the second state of energy is a state of energy of a second battery pack in the second mobile charging facility, and the third state of energy is a state of energy of a third battery pack of the third mobile charging facility in the return status. The sending unit 1103 is further configured to: when the processing unit detects that the third state of energy and the second state of energy meet the first preset condition, send a fourth indication signal to the third mobile charging facility, where the fourth indication signal is used to indicate the third mobile charging facility to charge the first vehicle.

That a third state of energy and the second state of energy meet a first preset condition includes: A second ratio is greater than or equal to a first threshold; and the second ratio is a percentage of a difference between the third state of energy and the second state of energy in the third state of energy.

Optionally, in a possible implementation of this embodiment, the sending unit 1103 is further configured to send a fifth indication signal to the second mobile charging facility, where the fifth indication signal is used to indicate the second mobile charging facility to return to be charged.

Optionally, in another possible implementation of this embodiment, the obtaining unit 1101 is further configured to: before the status of the third mobile charging facility is obtained, receive a first request message sent by a first terminal device, where the first request message is used to request to charge the first vehicle. The processing unit 1102 is further configured to determine the second mobile charging facility based on a location and a state of energy of a battery pack of each mobile charging facility in the charging system, and an energy consumption map, where the energy consumption map includes at least one path from a location of each mobile charging facility to a location of the first vehicle, and a power consumption status on each path. The sending unit 1103 is configured to send a sixth indication signal to the second mobile charging facility, where the sixth indication signal is used to indicate the second mobile charging facility to charge the first vehicle.

In addition, in a specific hardware implementation, an embodiment of this application further provides a network device. The network device may be a server, or a component integrated into a server.

Figure 12:
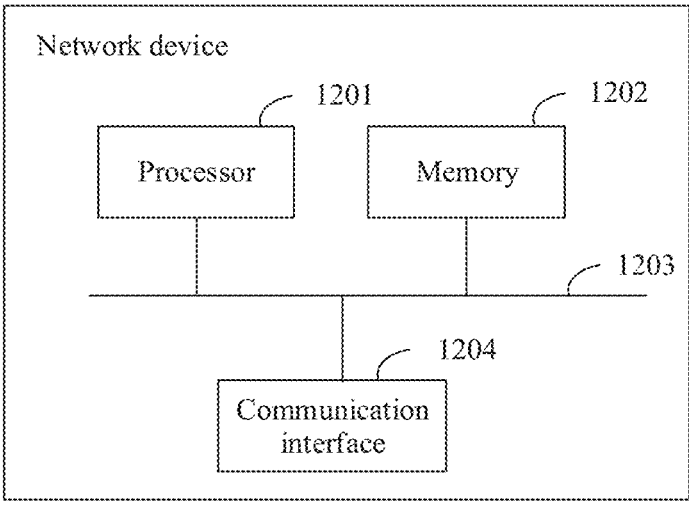
FIG. 12 is a schematic diagram of a structure of a network device according to an embodiment of this application.

FIG. 12 is a schematic diagram of a structure of a network device. The network device may include a processor 1201, a memory 1202, a communication bus 1203, and at least one communication interface 1204. The processor 1201, the memory 1202, and the at least one communication interface 1204 are coupled through the communication bus 1203.

The processor 1201 is a control center of the network device, and may be used for communication between devices, for example, information transmission between a mobile charging facility, a user terminal device, and a to-be-charged vehicle.

The processor 1201 may include an integrated circuit (IC), for example, may include a single packaged IC, or may include a plurality of packaged ICs that are connected and that have a same function or different functions. For example, the processor 1201 may include a central processing unit (CPU), a digital signal processor (DSP), or the like.

In addition, the processor 1201 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof. Optionally, the hardware chip is a processing chip.

The memory 1202 is configured to store and exchange various types of data or software, including storing a first request message, a second request message, a first indication signal, a second indication signal, and the like. In addition, the memory 1202 may store a computer program and code.

Specifically, the memory 1202 may include a volatile memory, for example, a random access memory (RAM), and may further include a nonvolatile memory, for example, a flash memory, a hard disk drive (HDD), or a solid-state drive (SSD). The memory 1202 may further include a combination of the foregoing types of memories.

The communication interface 1204 uses any apparatus such as a transceiver, and is configured to communicate with another device or communication network, such as the Ethernet, a radio access network (RAN), a wireless local area network (WLAN), or a virtual extensible local area network (VXLAN). In this embodiment, the communication interface 1204 includes at least one interface.

It should be understood that the network device may further include more or fewer other components, and the schematic structure in this embodiment of this application does not constitute a specific limitation on the network device. In addition, the components shown in FIG. 12 may be implemented by hardware, software, firmware, or any combination thereof.

When software is used to implement the foregoing embodiments, all or some of embodiments may be implemented in a form of a computer program product. For example, the obtaining unit 1101 and the sending unit 1103 in the apparatus shown in FIG. 11 may be implemented by using the communication interface 1204, a function of the processing unit 1102 may be implemented by the processor 1201, and a function of the storage unit may be implemented by the memory 1202.

Specifically, the network device receives, through the communication interface 1204, a request message sent by at least one terminal device, and the processor 1201 determines, based on the request message, and schedules a mobile charging facility to execute a charging task corresponding to the request message. When the mobile charging facility completes the charging task and returns to a charging pile to be charged, the mobile charging facility invokes the program code in the memory 1202 to perform the vehicle charging method described in steps 101 to 104 in FIG. 4 in the foregoing embodiment.

In addition, the network device further includes a mobile communication module, a wireless communication module, and the like. The mobile communication module includes a module with a wireless communication function such as 2G/3G/4G/5G. In addition, the apparatus may further include a filter, a switch, a power amplifier, a low noise amplifier (LNA), and the like. The wireless communication module may provide a wireless communication solution that is applied to a network device and includes a WLAN, Bluetooth, a global navigation satellite system (GNSS), frequency modulation (FM), and the like.

In addition, an embodiment of this application further provides a mobile charging system. The system structure is shown in FIG. 2, and includes a server 11, at least one vehicle system 12, a mobile charging facility 13, a charging pile 14, and the like. A structure of the server 11 may be the network device shown in FIG. 12, and is configured to implement the vehicle charging method in the foregoing embodiment.

A structure of the mobile charging facility 13 may be the same as or different from a structure of the network device shown in FIG. 12. A structure and a specific form of the in-vehicle infotainment are not limited in this embodiment. In addition, the mobile charging facility 13 carries at least one battery pack.

According to the method provided in this embodiment, when it is detected that a battery pack of a network device is in a charging state or a fully charged state, a charging indication signal is sent to the mobile charging facility, so that the mobile charging facility executes a charging task in the charging state or once the mobile charging facility reaches the fully charged state. A replaced mobile charging facility returns to be charged. This prevents the mobile charging facility in the fully charged state from waiting in place for the server to deliver a new charging task, eliminates time for the mobile charging facility to wait in place, and improves a throughput and charging efficiency of electric energy of the charging system.

An embodiment of this application further provides a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses.

The computer program instructions may be stored in a computer-readable storage medium or may be transmitted from a computer-readable storage medium to another computer-readable storage medium. For example, the computer instructions may be transmitted from a communication device, a computer, a server, or a data center to another communication device in a wired or wireless manner.

The computer program product and the computer program instructions may be located in the memory 1202 of the network device, to implement the vehicle charging method according to this embodiment of this application.

In addition, in the descriptions of embodiments of this application, the at least one is one or more. In addition, to clearly describe the technical solutions in embodiments of this application, terms such as first and second are used in embodiments of this application to distinguish between same items or similar items that provide basically same functions or purposes. A person skilled in the art may understand that the terms such as "first", "second", and "third" do not limit a quantity or an execution sequence, and the terms such as "first" and "second" do not indicate a definite difference.

The foregoing descriptions are embodiments of this application, but are not intended to limit the protection scope of this application.

What is claimed is:

1. A method, wherein the method comprises:

obtaining, by a server, a status of a first battery pack in a first mobile charging facility, wherein the server schedules a plurality of mobile charging facilities to charge a plurality of vehicle, and the plurality of mobile charging facilities include the first mobile charging facility and a second mobile charging facility;

in response to determining that the first battery pack is in a charging state or a fully charged state, obtaining, by the server, a second state of energy sent by the second mobile charging facility, wherein the second mobile charging facility is charging a first vehicle, and the second state of energy is a state of energy of a second battery pack in the second mobile charging facility; and sending, by the server, a first indication signal to the first mobile charging facility in response to at least that a first state of energy and the second state of energy meet a first preset condition, wherein the first indication signal indicates the first mobile charging facility to charge the first vehicle, and the first state of energy is a state of energy of the first battery pack in the charging state or the fully charged state.

2. The method according to claim 1, wherein the method further comprises:

sending a second indication signal to the second mobile charging facility, wherein the second indication signal indicates the second mobile charging facility to return to be charged.

3. The method according to claim 2, wherein the first preset condition comprises: a first ratio is greater than or equal to a first threshold; and the first ratio is a percentage of a difference between the first state of energy and the second state of energy in the first state of energy.

4. The method according to claim 3, wherein before the obtaining a second state of energy sent by a second mobile charging facility, the method further comprises:

determining the second mobile charging facility; and the determining the second mobile charging facility comprises:

in response to determining that a mobile charging facility in a charging system is charging a vehicle, determining that the mobile charging facility is the second mobile charging facility; or in response to determining that two or more mobile charging facilities in the charging system are charging the vehicle, determining that the second mobile charging facility is one having a maximum first ratio in the two or more mobile charging facilities.

5. The method according to claim 4, further comprising:

in response to determining that the two or more mobile charging facilities in the charging system are charging the vehicle, determining that the second mobile charging facility is one having a maximum of a second ratio in the two or more mobile charging facilities, wherein the second ratio is a percentage of a state of remaining energy in a battery pack of the first mobile charging facility in the first state of energy, the state of remaining energy is represented as $Q_{remaining}$, $Q_{remaining}=Q1-Q2-Q_S$, Q1 represents the first state of energy, Q2 represents the second state of energy, and $Q_S$ represents a state of energy consumed on a path in response to at least that the first mobile charging facility travels from a current location to a location of a mobile charging facility corresponding to Q2.

6. The method according to claim 5, wherein before the obtaining a status of a first battery pack in a first mobile charging facility, the method further comprises:

receiving a first request message sent by a first terminal device, wherein the first request message requests to charge the first vehicle;

determining the second mobile charging facility based on a location and a state of energy of a battery pack of each mobile charging facility in the charging system, and an energy consumption map, wherein the energy consumption map comprises at least one path from a location of each mobile charging facility to a location of the first vehicle, and a power consumption status on each path; and sending a third indication signal to the second mobile charging facility, wherein the third indication signal indicates the second mobile charging facility to charge the first vehicle.

7. An apparatus, wherein the apparatus comprises:

at least one processor; and at least one memory coupled to the at least one processor and storing programming instructions for execution by the at least one processor to cause the apparatus to perform operations comprising:

obtaining a status of a first battery pack in a first mobile charging facility, wherein the apparatus schedules a plurality of mobile charging facilities to charge a plurality of vehicle, and the plurality of mobile charging facilities include the first mobile charging facility and a second mobile charging facility;

detecting whether the first battery pack is in a charging state or a fully charged state;

in response to at least detecting that the first battery pack is in the charging state or the fully charged state, obtaining a second state of energy sent by the second mobile charging facility, wherein the second mobile charging facility is charging a first vehicle, and the second state of energy is a state of energy of a second battery pack in the second mobile charging facility;

detecting whether a first state of energy and the second state of energy meet a first preset condition, wherein the first state of energy is a state of energy of the first battery pack in the charging state or the fully charged state; and in response to at least detecting that the first state of energy and the second state of energy meet the first preset condition, sending a first indication signal to the first mobile charging facility, wherein the first indication signal indicates the first mobile charging facility to charge the first vehicle.

8. The apparatus according to claim 7, wherein the operations further comprise: sending a second indication signal to the second mobile charging facility, wherein the second indication signal indicates the second mobile charging facility to return to be charged.

9. The apparatus according to claim 8, wherein the first preset condition comprises: a first ratio is greater than or equal to a first threshold, and the first ratio is a percentage of a difference between the first state of energy and the second state of energy in the first state of energy.

10. The apparatus according to claim 9, wherein the operations further comprise:

before the second state of energy sent by the second mobile charging facility is obtained, and in response to determining that one mobile charging facility in a charging system is charging a vehicle, determine that the mobile charging facility is the second mobile charging facility; or in response to determining that two or more mobile charging facilities in the charging system are charging the vehicle, determine that the second mobile charging facility is one having a maximum first ratio in the two or more mobile charging facilities.

11. The apparatus according to claim 10, wherein the operations further comprise:

in response to detecting that the two or more mobile charging facilities in the charging system are charging the vehicle, determine that the second mobile charging facility is one having a maximum of a second ratio in the two or more mobile charging facilities, wherein the second ratio is a percentage of a state of remaining energy in a battery pack of the first mobile charging facility in the first state of energy, the state of remaining energy is represented as $Q_{remaining}$, $Q_{remaining}=Q1-Q2-Q_S$, Q1 represents the first state of energy, Q2 represents the second state of energy, and $Q_S$ represents a state of energy consumed on a path in response to at least that the first mobile charging facility travels from a current location to a location of a mobile charging facility corresponding to Q2.

12. The apparatus according to claim 11, wherein the operations further comprise:

before the status of the first battery pack in the first mobile charging facility is obtained, receiving a first request message sent by a first terminal device, wherein the first request message requests to charge the first vehicle;

determining the second mobile charging facility based on a location and a state of energy of a battery pack of each mobile charging facility in the charging system, and an energy consumption map, wherein the energy consumption map comprises at least one path from a location of each mobile charging facility to a location of the first vehicle, and a power consumption status on each path; and sending a third indication signal to the second mobile charging facility, wherein the third indication signal indicates the second mobile charging facility to charge the first vehicle.

13. An apparatus, wherein the apparatus comprises:

at least one processor; and at least one memory coupled to the at least one processor and storing programming instructions for execution by the at least one processor to cause the apparatus to perform operations comprising:

obtaining a status of a third mobile charging facility, wherein the apparatus schedules a plurality of mobile charging facilities to charge a plurality of vehicle, and the plurality of mobile charging facilities include the third mobile charging facility and a second mobile charging facility;

in response to determining that the status of the third mobile charging facility is a return status after a charging task is executed, obtaining a second state of energy sent by the second mobile charging facility, and detecting whether a third state of energy and the second state of energy meet a first preset condition, wherein the second mobile charging facility is charging a first vehicle, the second state of energy is a state of energy of a second battery pack in the second mobile charging facility, and the third state of energy is a state of energy of a third battery pack of the third mobile charging facility in the return status; and in response to at least detecting that the third state of energy and the second state of energy meet the first preset condition, sending a fourth indication signal to the third mobile charging facility, wherein the fourth indication signal indicates the third mobile charging facility to charge the first vehicle.

14. The apparatus according to claim 13, wherein the operations further comprise: sending a fifth indication signal to the second mobile charging facility, wherein the fifth indication signal indicates the second mobile charging facility to return to be charged.

15. The apparatus according to claim 14, wherein the first preset condition comprises: a second ratio is greater than or equal to a first threshold, and the second ratio is a percentage of a difference between the third state of energy and the second state of energy in the third state of energy.

16. The apparatus according to claim 15, wherein the operations further comprise:

before the status of the third mobile charging facility is obtained, receiving a first request message sent by a first terminal device, wherein the first request message requests to charge the first vehicle;

determining the second mobile charging facility based on a location and a state of energy of a battery pack of each mobile charging facility in a charging system, and an energy consumption map, wherein the energy consumption map comprises at least one path from a location of each mobile charging facility to a location of the first vehicle, and a power consumption status on each path; and sending a sixth indication signal to the second mobile charging facility, wherein the sixth indication signal indicates the second mobile charging facility to charge the first vehicle.

* * * * *